United States Patent
Makita et al.

(10) Patent No.: US 10,172,374 B2
(45) Date of Patent: Jan. 8, 2019

(54) DRIED COMPOSITION AND FOOD PRODUCT CONTAINING THE SAME

(71) Applicant: INA FOOD INDUSTRY CO., LTD., Ina-shi, Nagano (JP)

(72) Inventors: Ken Makita, Ina (JP); Hiromitsu Hamano, Ina (JP); Kazuhiro Nagasaka, Ina (JP); Yuji Uzuhashi, Ina (JP)

(73) Assignee: INA FOOD INDUSTRY CO., LTD., Ina-shi (JP)

( * ) Notice: Subject to any disclaimer, the term of this patent is extended or adjusted under 35 U.S.C. 154(b) by 844 days.

(21) Appl. No.: 14/412,850

(22) PCT Filed: Jun. 2, 2014

(86) PCT No.: PCT/JP2014/064618
§ 371 (c)(1),
(2) Date: Jan. 5, 2015

(87) PCT Pub. No.: WO2015/011988
PCT Pub. Date: Jan. 29, 2015

(65) Prior Publication Data
US 2015/0282510 A1 Oct. 8, 2015

(30) Foreign Application Priority Data

Jul. 24, 2013 (JP) .................. 2013-154036
Nov. 18, 2013 (JP) .................. 2013-238300

(51) Int. Cl.
| | | |
|---|---|---|
| A23G 9/42 | (2006.01) | |
| A23L 2/52 | (2006.01) | |
| A23G 9/34 | (2006.01) | |
| A23C 9/137 | (2006.01) | |
| A23L 29/00 | (2016.01) | |
| A23L 29/256 | (2016.01) | |
| A23L 21/10 | (2016.01) | |
| A23L 7/109 | (2016.01) | |
| A23L 19/00 | (2016.01) | |
| A23L 33/21 | (2016.01) | |

(52) U.S. Cl.
CPC ............. *A23G 9/42* (2013.01); *A23C 9/137* (2013.01); *A23G 9/34* (2013.01); *A23L 2/52* (2013.01); *A23L 7/109* (2016.08); *A23L 19/09* (2016.08); *A23L 21/10* (2016.08); *A23L 29/015* (2016.08); *A23L 29/256* (2016.08); *A23L 33/21* (2016.08); *A23V 2002/00* (2013.01)

(58) Field of Classification Search
CPC .. A23G 9/42; A23G 9/34; A23L 19/09; A23L 29/256; A23L 33/21; A23L 7/109; A23L 21/10; A23L 29/015; A23L 2/52; A23C 9/137
See application file for complete search history.

(56) References Cited

U.S. PATENT DOCUMENTS

| | | | | |
|---|---|---|---|---|
| 1,913,576 A | * | 6/1933 | Walsh ............. | A23L 29/256 |
| | | | | 426/330 |
| 2,420,308 A | * | 5/1947 | Gates ............... | A61L 15/28 |
| | | | | 252/363.5 |
| 2007/0281065 A1 | | 12/2007 | Modliszewski et al. | |

FOREIGN PATENT DOCUMENTS

| | | |
|---|---|---|
| CN | 102763850 A | 11/2012 |
| JP | H04-207174 A | 7/1992 |
| JP | H10-136949 A | 5/1998 |
| JP | 2003-180265 A | 7/2003 |
| JP | 2011-110024 A | 6/2011 |
| JP | 2012-080806 A | 4/2012 |
| JP | 2012-130292 A | 7/2012 |
| JP | 2013-126401 A | 6/2013 |

OTHER PUBLICATIONS

Takano, Ryo et al. "Highly Methylated Agars with a High Gel-Melting Point From the Red Seaweed, *Gracilaria eucheumoides*." Phytochemistry, vol. 40, No. 2, pp. 487-490, 1995. (Year: 1995).*
Aug. 12, 2014 Search Report issued in International Patent Application No. PCT/JP2014/064618.
Aug. 12, 2014 Written Opinion issued in International Patent Application No. PCT/JP2014/064618.
Jan. 26, 2016 International Preliminary Report on Patentability issued in International Patent Application No. PCT/JP2014/064618.

* cited by examiner

*Primary Examiner* — Katherine D LeBlanc
(74) *Attorney, Agent, or Firm* — Oliff PLC

(57) ABSTRACT

A dried composition with various shapes that has heat resistance by which the dried composition is less likely to melt even being boiled and restorability (imbibition), and food product containing the dried composition. The dried composition including: agar and alginate at a weight ratio of 1:1 to 1:20, the alginate contains a salt of a monovalent cation and a salt of a divalent cation, the divalent cation is 0.04 to 0.30 mol per mol and further the monovalent cation is 0.10 to 0.70 mol per mol with respect to a monomeric unit of the alginate, a mol ratio of the divalent cation to the monovalent cation is 1.0:0.35 to 1.0:8.70, and the dried composition absorbs water and swells in distilled water at 20° C. and distilled water at 90° C., and in both the cases dried composition becomes a gel having a weight of 15 to 100 times of the dried composition.

18 Claims, No Drawings

DRIED COMPOSITION AND FOOD PRODUCT CONTAINING THE SAME

FIELD

The present invention relates to a dried composition that has heat resistance by which the dried composition is less likely to melt even being boiled and restorability (imbibition), and a food product containing the dried composition.

BACKGROUND

Alginic acid, and alginate, such as sodium alginate and potassium alginate, are produced by extracting polysaccharides, which is contained in brown algae, and processing the polysaccharides as required. Currently, as an application for a food product, the sodium alginate is widely and generally used mainly as a stabilizer for a frozen dessert. Additionally, applying reactivity of the alginate to calcium ion, an imitation food pectized as integuments of an artificial salmon roe and a caviar, a regenerative food such as onion rings, and a similar food product have been used.

A calcium-reaction gel of sodium alginate has properties of thermal irreversibility and heat resistance, which are not possessed by other pectizing agents. However, it is almost impossible to cause sodium alginate aqueous solution that the sodium alginate dissolved in water to uniformly react to calcium ion to produce a uniform gel. This is because of the following reason. Alginic acid ion reacts to the calcium ion in a blink. In view of this, the alginic acid ion promotes the reaction at a part in contact with calcium solution. Accordingly, as the calcium ion does not penetrate as being away from an interface with the calcium solution, the alginic acid ion fails to react to the calcium ion. As a result, even if calcium alginate gel is produced and the outside of the calcium alginate gel is hard and hydrophobized, the calcium ion does not penetrate to the inside of the calcium alginate gel and therefore the reaction does not proceed. Thus, a soft gel is formed. This gel is not uniformed even being left for a while. Thus, obtaining the uniform gel of calcium alginate is not easy. There is also a conventional problem of requiring an extremely complicated manufacturing process for manufacturing gels.

A dried product formed by drying the calcium alginate gel, for example, a dried product formed by freezing the calcium alginate gel for denaturation and then dehydrated and dried becomes the dried product where an insoluble fiber is hydrophobized. Thus, the dried product that is hardly restored is formed. In view of this, calcium alginate that has a dried form does not exist as a conventional food material. Although powder of the calcium alginate formed by replacing the sodium alginate with the calcium ion has been developed into a product, this is completely an insoluble and therefore has no restorability (imbibition). This limits the application of the powder.

On the other hand, agar, which is an extracted material similarly derived from seaweed, is dissolved in hot water and is uniformly pectized by cooling. The agar has a property of thermal reversibility. When heating the gel to 90 to 100° C., the gel is reconstituted to a sol, thus forming a solution. In view of this, the agar is not suitable for an application where the gel state is maintained and requires the heat resistance. In particular, recently, as a food material, the dried product made of the agar is produced. This is used by being reconstituted (imbibed) in cold water and warm water. However, these food materials are melted by heating to 90 to 100° C., which is a dissolution temperature of agar. A heat-resistant agar is also available. However, restorability (imbibition) of such agar in cold water and warm water is insufficient. This has problems of, for example, causing the agar to be tasted dried out and a flavor of food is not balanced.

Various studies have been conducted on a food product containing the agar and the alginate. For example, Patent Literature 1 discloses a dried rice-shaped food product mainly constituted of agar and alginic acid or alginate and formed into a rice shape. A ratio between the agar and the alginic acid or the alginate is 9:1 to 1:9. For example, Patent Literature 2 discloses a method for manufacturing a heat-resistant pectized food product that heats and dissolves a pectizing agent that has a property of being pectized by reacting to cation and a pectizing agent that has a property of being pectized by cooling without reacting to the cation. Then, the materials are cooled so as to be pectized. The obtained pectized material is shaped into an appropriate size as necessary. The pectized material is then dipped in a solution containing cation to further progress the pectization. Patent Literature 3 discloses a gel-like processed food product formed by pectizing a sol containing alginates and agar.

Patent Literature 4 discloses a noodle-shaped food product. The noodle-shaped food product is formed as follows. Sodium alginate is added to a soybean concoction and is formed into a noodle shape. The material is then discharged into a calcium solution and is coagulated. Then, the material is processed in a solution containing salt. When the gel adjusted as a result of a reaction of the sodium alginate and calcium salt (such as calcium chloride) is in contact with water solution containing a salt content, the gel softens and therefore the strength is degraded.

Further, Patent Literature 5 discloses a dried food and a method for producing the dried food. The dried food contains agar as a main agent and at least one kind of an auxiliary agent selected from alginic acid and a similar material. As a concrete example, the dried food at a weight ratio of the agar to the sodium alginate being 90/10, namely, 1:0.11 is disclosed (Working example 6). Patent Literature 6 also discloses a dried agar food ready for eating by reconstitution in water or in hot water and a method for producing the dried agar. To enhance the heat resistance, an auxiliary agent such as alginic acid may be dissolved. Then, saline such as Mg may be added to be reacted. Finally, the material may be mixed in a filtrate of the agar.

CITATION LIST

Patent Literature

Patent Literature 1: Japanese Unexamined Patent Application Publication No. 2012-80806
Patent Literature 2: Japanese Unexamined Patent Application Publication No. 2003-180265
Patent Literature 3: Japanese Unexamined Patent Application Publication No. 2012-130292
Patent Literature 4: Japanese Unexamined Patent Application Publication No. 2011-110024
Patent Literature 5: Japanese Unexamined Patent Application Publication No. 4-207174
Patent Literature 6: Japanese Unexamined Patent Application Publication No. 10-136949

SUMMARY OF INVENTION

Technical Problem

The food product disclosed in Patent Literature 1 features good restorability (imbibition) during rice cooking (in boiling water). However, the food product has a problem of poor restorability (imbibition) in cold water. Additionally, the food product is limited to the rice-shaped form. The food product has a problem of poor restorability (imbibition) in a shape having a small surface area, such as a noodle shape and a plate shape.

Patent Literatures 2 and 3 aim to produce the heat-resistant gel. Patent Literatures 2 and 3 do not disclose that this gel is formed into a dried product and is put into water and hot water for restoration.

In Patent Literature 4, the salt is used only to degrade the gel strength of the calcium alginate. Patent Literature 4 does not disclose that the gel is formed into the dried product and is restored by being put into water and hot water. Further, Patent Literature 4 does not disclose a combination use of the agar and the alginate.

In Patent Literature 5, the agar is the main agent. The content of the agar is relatively larger than the auxiliary agent. Accordingly, there is a problem of high melting rate when the dried food is reconstituted in hot water. Patent Literature 5 discloses that adding Ca and Mg and adding a reaction retarder, such as sodium citrate, are preferable. However, Patent Literature 5 does not disclose a specific amount of each ion to be added. Patent Literature 6 does not disclose amounts of the agar, the auxiliary agent, each ion to be added, nor similar information at all.

As described above, the following is demanded.
1. To provide a heat resistance to the dried product of agar, which conventionally has thermal reversibility, such that the dried product is less likely to melt even being boiled
2. To further improve the restorability (imbibition) of the dried product of the agar
3. To provide the restorability (imbibition) to the dried product made of the calcium alginate, which conventionally does not have restorability (imbibition)
4. To form the dried product into various shapes, such as a powder shape, a granular shape, the noodle shape, and a strip shape The present invention has been made to solve the above problems, and it is an object of the present invention to provide a dried composition with various shapes that has heat resistance by which the dried composition is less likely to melt even being boiled and restorability (imbibition), and a food product containing the dried composition.

Solution to Problem

As a result of intensive and extensive studies to solve the above-described problems, the present inventor has found the following and completed the present invention. The present inventor produces a dried product that mainly contains a pectized constituent. The pectized constituent is formed by adjusting a weight ratio of agar to a specific alginate and adjusting respective contents and ratios of monovalent cation and divalent cation contained in the alginate. This allows providing the heat resistance and the restorability (imbibition) by which the dried product with various shapes is less likely to melt even being boiled.

That is, the present invention is a dried composition comprising: agar and alginate at a weight ratio of 1:1 to 1:20, wherein the alginate contains a salt of a monovalent cation and a salt of a divalent cation, the divalent cation is 0.04 to 0.30 mol per mol and further the monovalent cation is 0.10 to 0.70 mol per mol with respect to a monomeric unit of the alginate, a mol ratio of the divalent cation to the monovalent cation is 1.0:0.35 to 1.0:8.70, and the dried composition absorbs water and swells in distilled water at 20° C. and distilled water at 90° C., and in both the cases the dried composition becomes a gel having a weight of 15 to 100 times of the dried composition.

The present invention also relates to the food product, wherein the dried composition is contained: as a daily dish of any of equal to or more than one of a noodle-shaped food product, a soup main ingredient, a hot-pot dish ingredient, a stir-fried food, a deep-fried food, a steamed food, a boiled food, and a marinated food; and as a food material of any of equal to or more than one of a salad, a pickle, a dessert material, a beverage, a frozen dessert, a jam, a fruit sauce, a fish egg imitation, a sarcocarp imitation, a wrap of a spring roll, a wrap of a shaomai, and a dietary fiber-enriched food.

Advantageous Effects of Invention

As described above, the present invention can provide dried compositions with various shapes having the heat resistance where the dried composition is less likely to melt even being boiled and restorability (imbibition) and a food product containing the dried composition.

DETAILED DESCRIPTION

A dried composition according to the present invention is a dried composition containing agar and alginate as a pectized constituent. A weight ratio of the agar to the alginate is 1:1 to 1:20. The alginate contains a salt of monovalent cation and a salt of divalent cation. The divalent cation is 0.04 to 0.30 mol per mol and further the monovalent cation is 0.10 to 0.70 mol per mol with respect to a monomeric unit of the alginate. A mol ratio of the divalent cation to the monovalent cation is 1.0:0.35 to 1.0:8.70. The dried composition according to the present invention is in a category as a general food material where a physical property is less likely to be changed due to growth of microorganism and environment in the form of the dried food. For example, this means that the dried composition is a moisture content of 0.1 to 20%, preferably, a dried state of 2 to 10%. The dried composition according to the present invention is preferable to be in the following state. Gel matrixes formed of three constituents, the agar, the salt of monovalent cation of alginic acid, and the salt of divalent cation of alginic acid, are intertwined and are present in a uniform state.

In the present invention, the weight ratio of the agar and the alginate is in a range of 1:1 to 1:20; however, the range is more preferable to be 1:1 to 1:10. The weight ratio of the agar to the alginate is the weight ratio of the dried composition. However, the weight ratio is equivalent to the weight ratio converted from a dried product of a raw material prepared during production. Accordingly, the weight ratio can be calculated by a dry weight ratio of the raw material. In the weight ratio of the agar to the alginate, if the agar is larger than 1:1, even the alginate reacts to the calcium, the heat resistance is not enhanced. Thus the dried composition is melted when reconstituting the dried composition by boiling; therefore, this is not preferable. If the agar is smaller than 1:20, a gel structure of the agar cannot be held. This breaks the structure by the reaction of the alginate and the calcium; therefore, this is not preferable.

In the present invention, the alginate contains the salt of monovalent cation and the salt of divalent cation. The salt of monovalent cation is, for example, the sodium alginate, the potassium alginate, and the ammonium alginate. The salt of monovalent cation may be used alone or may be used in combination with equal to or more than two kinds. The salt of divalent cation is, for example, the calcium alginate, the iron alginate, the zinc alginate, and the copper alginate. The salt of divalent cation may be used alone or may be used in combination with equal to or more than two kinds. Since the calcium salt reacts well and features high safety even if the intake is large, the salt of divalent cation is especially preferable to be the calcium salt. In some cases, this description hereinafter describes with an example where the calcium ion is used as the divalent cation and the calcium alginate is used as the salt of divalent cation.

In the dried composition according to the present invention, the divalent cation is contained 0.04 to 0.30 mol per mol with respect to the monomeric unit of the alginate. The monomeric unit of the alginate means one mol of β-D-mannuronic acid or α-L-guluronic acid (that is, a monosaccharide that can be expressed as $C_6H_8O_6$), which constitutes the alginic acid. For example, in the case where the divalent cation is the calcium ion, this means that Ca in the dried composition is contained 0.04 to 0.30 mol per mol with respect to one mol of $C_6H_8O_6$. If the divalent cation is less than 0.04 mol per mol, the gel is weak and therefore has no heat resistance, resulting in melting due to well-boiling. If the divalent cation is more than 0.30 mol per mol, the dried composition slightly absorbs water by restoring force of the agar, however, this fails to obtain hardness to obtain preferable oral sensation and the restorability of the gel; therefore, this is not preferable. The divalent cation is more preferable to be 0.10 to 0.26 mol per mol with respect to the monomeric unit of the alginate.

The dried composition according to the present invention, similar to the above-described dried composition, contains the monovalent cation of 0.10 to 0.70 mol per mol with respect to the monomeric unit of the alginate. If the monovalent cation is less than 0.10 mol per mol, the dried composition absorbs little water. This is less likely to obtain hardness to obtain preferable oral sensation and the restorability of the gel; therefore, this is not preferable. If the monovalent cation is more than 0.70 mols per mol, the gel is weak and therefore has no heat resistance. This is likely to melt the gel by well boiling. Accordingly, this is not preferable.

The mol ratio of the divalent cation to the monovalent cation is 1.0:0.35 to 1.0:8.70, and is more preferable to be 1.0:0.4 to 1.0:4.0. In the mol ratio of the divalent cation to the monovalent cation, if the monovalent cation becomes less than 1.0:0.35, the dried composition has poor restorability; therefore, this is not preferable. In the mol ratio of the divalent cation to the monovalent cation, if the monovalent cation is increased more than 1.0:8.70, the dried composition has good restorability but the gel has poor heat resistance and poor hardness; therefore, this is not preferable. For example, Patent Literature 1 discloses the agar-alginate composition. However, since the agar-alginate composition does not contain the monovalent cation in the above-described range, the dried composition has poor water-absorption restoring force when being added in water. However, the dried composition of the present invention fixes the mol ratio of the divalent cation to the monovalent cation in the dried composition within the range. The dried composition becomes a gel that has remarkable restorability (imbibition) and good heat resistance after absorbing water. Thus, the dried composition has excellent properties of both the heat resistance and restorability (imbibition).

The number of moles of the monovalent cation and the divalent cation in the alginate of the present invention can be measured using an Inductively Coupled Plasma (ICP) emission spectroscopic analyzer. A method disclosed in working example, which will be described later, is applicable to the specific measuring method.

The numbers of moles of the monovalent cation and the divalent cation in the alginate of the present invention are the numbers of moles in the dried composition. The numbers of moles differ from the numbers of moles of the monovalent cation and the divalent cation added during the production process and the number of moles of the monovalent cation and the divalent cation in the gel produced in the production process. This is because of the following reason. The monovalent cation and the divalent cation that do not react during the production process change caused by an outflow due to taking off the gel from water in the process of drying the gel, separation due to deposition during the drying, an outflow due to taking off the gel from water by denaturation caused by freezing, or a similar cause.

The dried composition of the present invention is preferable to be obtained through pectizing the sol containing the agar and the alginate and then performing a drying process. That is, specifically, the dried composition is preferable to be obtained through the following production method. The production method includes a process of obtaining a mixed solution where the agar and the alginate are dissolved; a process of obtaining an agar gel by cooling the mixed solution; a process of obtaining an alginate gel by reacting the divalent cation to the alginate; a process of drying the agar gel and the alginate gel; and a process of adding a monovalent cation during each of the processes, between the respective processes.

In the process of obtaining the mixed solution where the agar and the alginate are dissolved, the used agar is polysaccharides. The polysaccharides are formed by extracting red algae, such as Gelideaceae, Gracilariaceae, and Phyllophoraceae, in hot water or drying after the extraction in hot water. The kind of the agar is not specifically limited. However, the agar is preferable to have a high gel melting point as much as possible and viscosity, and is more preferable to have a high strength. The gel melting point is preferable to be 90° C. or higher and is more preferable to be 95° C. or higher. The gel strength is preferable to be 400 $g/cm^2$ or more, more preferable to be 700 $g/cm^2$ or more, and is further preferable to be 1000 $g/cm^2$ or more. Selecting this agar allows reducing melting in hot water as much as possible. This agar can be obtained as a "high-melting point agar" by the method disclosed in, for example, Japanese Unexamined Patent Application Publication No. 63-267245. Specifically, the agars on the market are, for example, Ina Agar KARIKORIKAN, Ina Agar M-13, and Ina Agar EM-15.

In the process of obtaining the mixed solution where the agar and the alginate are dissolved, the used the alginic acid; the alginate, such as the sodium alginate, the potassium alginate, and the calcium alginate; and alginic acid ester, such as alginic acid propylene glycol, are produced by extracting the polysaccharides contained in the brown algae, such as *Lessonia, Ascophyllum, Laminaria*, and *Macrocystis*, and processing the polysaccharides as necessary. The alginic acid itself is a water-insoluble constituent. However, the alginate where a carboxyl group in the constituent sugar is ionized and coupled to monovalent metal salt, such as sodium, potassium, and ammonium, increases solubility, transforming to be soluble in cold water.

Accordingly, in the process, the solution where the alginate is dissolved can be preferably obtained by dissolving the alginate, for example, sodium salt, potassium salt, and ammonium salt of the alginic acid, in water. The solution where the alginate is dissolved can be produced by solubilizing the alginic acid with alkaline water solution, such as sodium hydroxide. Typically, using the sodium alginate, which is further mass-produced, is especially preferable. The alginate is preferable to be an M/G ratio, which is a ratio of mannuronic acid (M) and glucuronic acid (G), being in a range of 0.5 to 2.0. However, the use of the alginate at high M/G ratio forms a soft gel. Meanwhile, the use of the alginate at low M/G ratio forms a further inflexible gel. Accordingly, the M/G ratio in an optimum range can be selected according to the purpose.

A solution extracted from the seaweed may be used as the agar and the alginate. A solution formed by dissolving the agar or the alginate as the dried product dehydrated from extraction liquid in hot water may be used. Alternatively, a solution formed by dispersing the agar and the alginate as the dried product in water and then dissolving the agar and the alginate by increasing the temperature may be used.

The agar is usually dissolved in hot water and is uniformly pectized by cooling. However, since the agar has a property of thermal reversibility, if the gel is heated to 90 to 100° C., the gel is reconstituted to the sol and becomes a solution. Nowadays, as the food material, the following method is used. The dried product, such as granular-shaped, noodle-shaped, or plate-shaped agar, is produced. Then, the dried product is restored (absorbs water and swells) in cold water and warm water for use. However, these food materials are melted by heating to 90 to 100° C., which is the dissolution temperature of the agar. Accordingly, the food materials cannot be used for an application such as a hot-pot dish, a boiled food, or a stir-fried food. Thus, providing the heat resistance by which the agar is less likely to melt even being boiled is desired. The heat-resistant agar (Japanese Unexamined Patent Application Publication No. 63-267245) is also available. However, the restorability (imbibition) of these food materials in cold water and warm water is insufficient. Since this causes the agar to be tasted dried out and a flavor of food is not balanced; this is not preferable.

On the other hand, the alginate solution has characteristics of being pectized by reaction to divalent calcium ion. A G block coupled axial-axial structurally takes in the calcium ion, thus generating pectization (Egg Box Junction). The calcium alginate gel has properties of thermal irreversibility and heat resistance, which are not possessed by other pectizing agents. However, it is difficult to cause sodium alginate aqueous solution to uniformly react to the calcium ion to produce a uniform gel. Therefore, usually, poorly-soluble calcium salt and dissolution accelerator are combined with the alginate solution, or the reaction retarder is added to soluble calcium. Thus, gelation reaction is controlled to design the calcium alginate gel. However, the combination of the poorly-soluble calcium salt and the dissolution accelerator still forms the gel that is reacted non-uniformly. Further, the combination of the soluble calcium and the reaction retarder forms an insufficient gel, resulting in a flexible gel of strong paste-like feeling; therefore, these are not preferable. Additionally, with this method, if the material is dissolved in another water solution other than water (for example, coffee and fruit juice), due to a dispersion of contained ion, which is specific to a natural product, the desired gel further fails to be obtained; therefore, this is not preferable.

The dried product formed by drying the calcium alginate gel, for example, the dried product formed by freezing the calcium alginate gel for denaturation and then is dehydrated and dried separates water held as free water in a mesh structure of a molecular chain of the calcium alginate. This further hydrophobizes the insoluble fiber, thus forming the dried product that is hardly restored.

As described above, it is difficult to produce the gel dried composition having both the heat resistance and restorability (imbibition) with only the agar or only the alginate. However, when producing the dried composition as follows like the present invention, both the heat resistance by which the dried composition is less likely to melt even being boiled and restorability (imbibition) can be achieved. The weight ratio of the agar to the alginate is designed to 1:1 to be 1:20. The alginate contains both the salt of monovalent cation and the salt of divalent cation. The divalent cation is 0.04 to 0.30 mol per mol and further the monovalent cation is 0.10 to 0.70 mol per mol with respect to the monomeric unit of the alginate. The mol ratio of the divalent cation to the monovalent cation is 1.0:0.35 to 1.0:8.70.

In the process of obtaining an alginate gel by reacting the divalent cation to the alginate, the used divalent cation is, for example, the calcium ion, ferric iron, zinc ion, and copper ion. As the calcium ion, using the calcium chloride, calcium lactate, calcium gluconate, calcium acetate, calcium hydroxide, or similar calcium is preferable.

In the process of drying the agar gel and the alginate gel, the drying method is not especially limited. The drying can be performed by hot-air drying, hot-air drying after freezing and dehydrating, freeze-dry, vacuum drying, hot-air drying after dehydration under pressure, or a similar method.

The process of adding the monovalent cation may be performed at any one of during another process or between the processes. That is, the monovalent cation is added by, for example, any of the following methods. The monovalent cation is added when creating the mixed solution. The monovalent cation is added when reacting the alginate and the divalent cation. The monovalent cation is added after forming an insoluble gel of the alginic acid divalent cation. The monovalent cation is further added in the drying process. Alternatively, the monovalent cation is added at between these processes. Among these methods, adding the monovalent cation after the process of cooling the mixed solution and obtaining the agar gel is more preferable. As one example, a further specific production method in the case of using powder of the agar and the alginate is as follows. After dispersing the agar and the alginate in water, the water is heated and dissolved, and then is cooled to equal to or less than a condensing temperature of the agar. Thus, the water is pectized. After forming this gel into a constant shape, the gel is put into a divalent cation solution such as the calcium. After removing the divalent cation solution, the gel is further dipped in a monovalent cation solution such as the sodium solution. Then, the gel from which the monovalent cation solution is removed is dried.

The monovalent cation may not be employed for dip as the solution as described above but may be added to the dried product by, for example, spray. The method is not especially limited as long as a specified amount is contained in a final product (dried product).

In the case where a sodium ion is used as the monovalent cation, a sodium chloride, a sodium citrate, sodium monohydrogenphosphate, sodium dihydrogenphosphate, a sodium hydrogencarbonate, or a similar material can be preferably used. As the monovalent cation, as well as the sodium ion, the potassium ion, the ammonium ion, or a similar ion can be used. However, the sodium ion, which less affects a taste, is preferable. The potassium ion is potassium chloride, potassium phosphate (potassium monohydrogenphosphate and potassium dihydrogenphosphate), or a similar material. The ammonium ion is ammonium chloride, ammonium sulfate, or a similar material.

In particular, in the case where the monovalent cation is added before creating the insoluble gel of the calcium alginate (alginic acid divalent cation), it is preferable to use salt, which does not have an effect of calcium chelate so as not to prevent the reaction of forming the gel. Specifically, the sodium chloride, the potassium chloride, the ammonium chloride, the sodium hydrogencarbonate, the sodium carbonate, and the ammonium sulfate are preferable. Among them, the sodium chloride, the potassium chloride, and the ammonium chloride are more preferable. In the case where the ratio of sodium alginate is especially high with respect to the agar, an influence of the heat resistance brought by the calcium alginate becomes strong. Accordingly, as well as these preferable salts, adding a small amount of the monovalent cation, which has an effect of calcium chelate, is also possible.

Generally, sodium phosphate, sodium citrate, or a similar material, which regulates the gelation reaction of the calcium alginate used as the reaction retarder, masks the calcium by the chelate effect to eliminate a property as the calcium. This prevents replacement of the sodium alginate by the calcium. Accordingly, if the large amount of reaction retarder is added under the presence of the calcium, the sodium alginate does not become the calcium salt, thus the material is not pectized.

As described above, usually, the pectizing agent reacting to calcium, such as the sodium alginate and gellan gum, has strong reactivity to calcium. This generates a phenomenon of pectization (preset) at the moment of a contact with the calcium ion. If the preset occurs, it is difficult to form the gel into the constant shape. Additionally, this causes a problem that the formed gel becomes uniform. As a method to solve the problem, the following is employed. The soluble calcium, such as the calcium chloride, and the reaction retarder (a substance having an effect of chelating the calcium), such as phosphate, are added to the sodium alginate solution at the same time. Thus, the calcium is masked to prevent the preset. Gradually, the sodium alginate is pectized as the calcium salt. Since the above-described phenomenon occurs, in the case where the monovalent cation, such as the sodium phosphate and the sodium citrate, is used as the reaction retarder, there is no point if the sodium alginate and the gellan gum is not added in a state of the solution before reacting to the calcium.

In contrast to this, the present invention does not require a reaction retarding effect. This is because that the material pectized using the reaction retarder exhibits weak reactivity to calcium and therefore lacks in the heat resistance. The monovalent cation that does not have the chelate effect derived from the sodium chloride, the potassium chloride, the ammonium chloride, the sodium carbonate, or a similar material adjusts a calcium reaction by equilibrium with the calcium ion in the solution and antagonizing the calcium ion. Accordingly, unlike the case of the reaction retarder, even if excessively added, the monovalent cation reacts to the calcium ion and is pectized as the calcium alginate.

However, in the present invention, if the sodium phosphate, the sodium citrate, or a similar material is acted on the material where the gel of the calcium alginate is once formed, this does not act as the reaction retarder. Accordingly, the heat resistance may be obtained. That is, in the present invention, when using the monovalent cation such as the sodium phosphate and the sodium citrate, which are generally known as the reaction retarder, so as to provide a reaction retarding effect as usual, the heat resistance cannot be obtained; therefore, this is not preferable. However, depending on the adding process, the reaction retarding effect is unsuccessful. In this case, such material possibly can be employed.

The reason that the adding of the monovalent cation improves the restorability (imbibition) in the present invention is possibly the following. For example, assume the case where as the alginate used for the alginate solution, the sodium alginate is used and the calcium ion is used as the divalent cation. Adding the calcium ion to a sodium alginate solution generates water-insoluble calcium alginate by replacement of the sodium by the calcium. Since the calcium alginate is water-insoluble, reconstitution of the calcium alginate in water is extremely poor. Here, if the salt of monovalent cation, such as the sodium, the potassium, and the ammonium; for example sodium salt, such as the sodium chloride, the sodium hydrogencarbonate, sodium citrate, and sodium phosphate (sodium monohydrogenphosphate and sodium dihydrogenphosphate) are present, the calcium alginate and the sodium alginate are in an equilibrium state. Accordingly, hydrophobic fiber made of strong calciums that are partially and unevenly distributed is not produced, and the material is likely to absorb water and also has the heat resistance. Thus, the material has advantages of both materials. That is, as described above, in the present invention, the monovalent cation does not function as the reaction retarder. The monovalent cation is added expecting the restorability from the dried product. This adding is consistently established on the balance with the heat resistance.

The dried composition according to the present invention obtained as described above absorbs water, swells (is restored), and then pectizes in both cases of using distilled water at 20° C. and distilled water at 90° C. (hot water). In both cases, the dried composition becomes the gel having a weight of 15 to 100 times, preferably, 20 to 80 times of the dried product. Here, the dried composition absorbs water and swells (is restored) to become the gel at the weight of 15 to 100 times of the dried product means the following. The dried composition is dipped in the distilled water 200 times or more of the dried composition at 20° C. for ten minutes to pectize the dried composition by imbibition. Thus, the weight of the gel becomes 15 to 100 times of the dried product. When using hot water at 90° C., the dried composition is dipped in the hot water 200 times or more of the dried composition at 90° C. for three minutes for imbibition. Thus, the dried composition is pectized.

When restoring the dried composition according to the present invention in water and hot water (for example, the distilled water at 20° C. and the hot water at 90° C.), because of the following reason, excellent water absorbency and heat resistance are obtained. The dried composition of the present invention forms a complex with the calcium alginate, the agar, and the monovalent cation at a constant proportion. When adding this composition in the water and the hot water, first, since the monovalent cation weakens the calcium reactivity of the calcium alginate, an egg box structure weakens. Accordingly, the composition easily absorbs water and swells. This swollen state contains a large amount of water vapor. Accordingly, the monovalent cation having high water solubility is likely to be flown out. If the monovalent cation flows out, the calcium content coupled with the alginic acid in the swollen composition increases, thus improving the heat resistance. Accordingly, the composition featuring high imbibition property and high heat resistance can be obtained. In the case of using the reaction retarder, when the composition swells in the water and the hot water, the monovalent cation and the calcium ion flow out. Accordingly, the heat resistance is inferior to the salt, which has no reaction retarding effect.

To obtain the feature of the present invention, it is preferable to react the divalent cation to form the gel, in the dried product or in the gel that has absorbed water and swollen, to the uniformly dispersed alginate. The following describes the case of using the calcium ion as the divalent cation.

To uniformly disperse the alginate, as described above, first, the agar and the alginate at a predetermined combination are heated and dissolved up to the temperature of dissolving the agar to form uniform compound liquid. This solution is cooled and the agar is pectized by sol-gel transfer. In this gel, the agar, which is almost neutral polysaccharide hardly containing an ionic group, does not react to the alginate. Accordingly, the alginate solution is uniformly dispersed in the agar gel. Afterwards, to provide the thermal-irreversible heat resistance to the gel, it is preferable to react the gel to the calcium ion and form the insoluble gel of the calcium alginate.

Forming the agar gel first is to uniformly arrange molecules of the alginate in the gel and to prevent the fiber from hydrophobizing, separating the water, and binding at the subsequent calcium reaction. This method uniformly puts a high-order structure matrix of the agar uniformly into the egg box high-order structure matrix formed by the alginate and the calcium. This state is also similarly maintained in the case of forming the dried product. Accordingly, when put into the water, a restoration effect of the agar molecules spreads out the egg box higher-order structure of the calcium alginate. Further, putting the water here strengthens a zeta potential between the molecules. Accordingly, the higher-order structure is further spread out. Since the agar molecules are uniformly dispersed in the egg box high-order structure matrix of the calcium alginate, the composition is not melted even in boiling water.

Moreover, as a method for producing the dried composition made of the calcium alginate, which becomes a gel that absorbs water and has good restorability (imbibition) and heat resistance, in addition to uniform dispersion of the alginate molecules in the mesh structure of the agar molecules, it is important to uniformly react the calcium and increase the heat resistance. To do so, the most preferable method is a method of reacting the calcium and then dipping the material in a monovalent cation solution such as the sodium solution. When dipping the material in the monovalent cation solution, as described above, the calcium alginate and the monovalent cation are in an equilibrium state. Accordingly, hydrophobic fiber made of strong calcium that are partially and unevenly distributed is not formed, and the material is likely to absorb water and also has the heat resistance.

The present invention allows adding other additives within the range where effects of the agar and the alginate are not prevented. The additive is, for example, polysaccharides, emulsifier, pigment, flavoring, seasoning, a sugar, saline, vitamin, and mineral functional materials. The polysaccharides are, for example, carrageenan; starch; processed starch, such as emulsifying starch, etherified starch, phosphorylated starch, acetylated starch, and oxidized starch; fenugreek gum; guar gum; tara gum; locust bean gum; cassia gum; xanthan gum; xanthan gum that is heated and modified; succinoglycan; gelatin; water-soluble gelatin; tamarind gum; pectin; cellulose; CMC-Na; hydroxypropyl cellulose; methylcellulose; hydroxypropylmethyl cellulose; gum arabic; soybean the polysaccharides; pullulan; curdlan; gellan gum; and native gellan gum.

The dried composition according to the present invention can have various shapes such as a powder shape, a granular shape, the noodle shape, the plate shape, and a cube shape. This is because that pectizing the agar allows forming any given shape. For example, the sol with this combination is casted into a mold with a target shape and then is cooled. Thus, the gel can be produced. Alternatively, the gel can be cut off to produce any given shape. The dried composition according to the present invention has the heat resistance by which the dried composition is less likely to melt even being boiled. Here, one index of the heat resistance by which the dried composition is less likely to melt even being boiled is as follows. When putting the gel that absorbs water and swells (is restored) in the boiling water for five minutes, the gel does not become a solution but the shape is held. Further, by regulating the amount of cation, in the dried composition according to the present invention, the gel does not become the solution even by retort sterilization (high temperature sterilization) at 100° C. or higher and can hold the shape.

By these shapes and the properties, the dried composition according to the present invention can be utilized to various applications, for example, a noodle-shaped food product, a soup ingredients, hot-pot dish ingredients, a daily dish such as a stir-fried food, a deep-fried food, a steamed food, a boiled food, and a marinated food, a salad, pickles, a dessert material, a beverage, a frozen dessert, a jam, a fruit sauce, an imitation such as a fish egg and a sarcocarp, wraps of a spring roll, shaomai, or a similar food, and a dietary fiber-enriched food.

More specifically, the cube-shaped dried composition at 10 to 20 mm absorbs water and swells by being dipped in syrup. A fruit, a red pea, or similar food is added to the syrup. Thus, the cube-shaped dried composition can be utilized as MITSUMAME. Conventional large-scale manufacturing equipment and labor where a producer dissolves the agar and cuts the agar into dices after cooling and pectizing the agar are omitted. Accordingly, there is an advantage that the agars can be easily produced by an amount of the dice-shaped gels to be used as required. A thermal death point can be set to a temperature higher than a temperature where a conventional agar gel is not melted. Accordingly, there is an advantage that the sterilization can be perforated in a short period.

Furthermore, the dried composition that can be retort-sterilized is available for a retort-sterilized product of a neutral food product. For example, in a sukiyaki-like retort daily dish, a noodle-shaped dried composition is used as a substitution of konnyaku strings and kudzu starch noodles. This prevents meet from hardening like the case of using the konnyaku strings. Additionally, the dried composition is not soaked, the oral sensation is not changed, and the dried composition is not dissolved by boiling like the case of using the kudzu starch noodles. Additionally, for a pot, instead of the kudzu starch noodles, konnyaku noodles, and the konnyaku strings, the daily dish where the taste is well macerated and the new oral sensation is provided can be made. In the retort sterilization of ZENZAI, since this drying product has the heat resistance, the ZENZAI with dice-shaped jelly can be made.

The granular-shaped dried composition is caused to absorb water with syrup for swelling. Then, the dried composition is added to the fruit sauce and is thermally sterilized. Thus, the fruit sauce with jelly can be produced. Accordingly, the new oral sensation can be provided to applications of a fruit sauce, for soft yoghurt, ice cream, crape and etc. In the application of the fruit sauce, the fruit sauce may be aseptically filled and mixed with yoghurt.

Accordingly, these granular-shaped dried compositions having heat resistance are effective.

Furthermore, as the granular-shaped dried composition can be added to the beverage, it can be used as a beverage with jelly. As a matter of course, when the dried composition is added in the jelly, jelly-in-jelly of a different oral sensation is made.

With the sheet-shaped dried composition at 10 cm$^2$ after the dried composition is reconstituted in hot water, the new oral sensation of a fresh spring roll is available like the wrap of the spring roll. The fresh spring roll can also be steamed and the warm fresh spring roll can be eaten. Additionally, the fresh spring roll is not aged over time, allowing obtaining a stable oral sensation.

Since the dried composition according to the present invention is constituted of the agar and the alginate, the dried composition is a material at a low-calorie and contains a large amount of dietary fiber. Accordingly, adding the dried composition as the food material allows taking the dietary fiber easily while limiting the calorie. Currently, a shortage of the dietary fiber has been pointed out. Accordingly, the dried composition of the present invention that can be used easily for various food products is effective means for taking dietary fiber.

WORKING EXAMPLE

The following specifically describes the present invention based on working examples. However, the working examples do not limit the object of the present invention.

First, materials used in the working examples are as follows.

Sodium alginate (1): Ina Gel GS-20, produced by Ina Food Industry Co., Ltd. (weight average molecular weight Mw: 200000)
Sodium alginate (2): Ina Gel GS-30, produced by Ina Food Industry Co., Ltd. (weight average molecular weight Mw: 250000)
Sodium alginate (3): Ina Gel GS-50, produced by Ina Food Industry Co., Ltd. (weight average molecular weight Mw: 500000)
Potassium alginate (1): Ina Gel GP-20, produced by Ina Food Industry Co., Ltd. (weight average molecular weight Mw: 200000)
Ammonium alginate (1): Ina Gel GA-20, produced by Ina Food Industry Co., Ltd. (weight average molecular weight Mw: 200000)
Agar (1): Ina Agar M-13 (high-melting point agar), produced by Ina Food Industry Co., Ltd.
Agar (2): Ina Agar UM-11 (high-melting point agar), produced by Ina Food Industry Co., Ltd.
Agar (3): Ina Agar S-10, produced by Ina Food Industry Co., Ltd.
Agar (4): Ina Agar KARIKORIKAN (high-melting point agar), produced by Ina Food Industry Co., Ltd.
Sodium chloride: table salt, produced by Japan Tobacco Inc.
Calcium chloride: produced by Tomita Pharmaceutical Co., Ltd.
Potassium chloride: produced by Tomita Pharmaceutical Co., Ltd.
Ammonium chloride: produced by AKO KASEI CO., LTD.
Sodium hexametaphosphate: produced by FC CHEMICAL Co., Ltd.
Calcium monohydrogenphosphate: produced by Taihei Chemical Industrial Co., Ltd.
Sodium citrate: produced by IWATA CHEMICAL., LTD.
Unless otherwise specified, % indicates weight %.

The working examples measure physical properties as follows.

(1) Mol Ratio of Calcium (Divalent Cation) and Sodium (Monovalent Cation) With Respect to Monomeric Unit of Alginate Using ICP (ICPE-9000, produced by SHIMADZU CORPORATION), an amount of calcium (amount of divalent cation) (weight %) and an amount of sodium (amount of monovalent cation) (weight %) in a dried product were measured. The weight average molecular weight (Mw) of the alginate was measured by GPC method using HPLC. As described in the following, the dried product constituted of only the agar and not containing the alginate was similarly produced. The amount of calcium (amount of divalent cation) (weight %) and an amount of sodium (amount of monovalent cation) (weight %) were measured. Then, the amount of calcium (amount of divalent cation) and the amount of sodium (amount of monovalent cation) contained in the alginate in the dried product were calculated. Using the amount of the monovalent cation and the amount of the divalent cation contained in the alginate and the weight average molecular weight (Mw) of the alginate, the mol ratios of the calcium and the sodium with respect to the monomeric unit of the alginate contained in the dried product were calculated.

Amount of calcium (amount of divalent cation) in the alginate in the agar-alginate dried product (weight %)=$A-B$ [Expression 1]

Amount of sodium (amount of monovalent cation) in the alginate in the agar-alginate dried product (weight %)=$C-D$ [Expression 2]

A: calcium content (amount of divalent cation) in the agar-alginate dried product (weight %)
B: calcium content (amount of divalent cation) in the dried product produced with only the agar same weight of the agar contained in A (weight %)
C: sodium content (amount of monovalent cation) in the agar-alginate dried product (weight %)
D: sodium content (amount of monovalent cation) in the dried product produced with only the agar same weight of the agar contained in C (weight %)

(2) Amount of Water Absorption

Each dried product of 3.0 g was dipped in the distilled water of 500 g at 20° C. for 30 minutes to restore and swell the dried products. This weight was measured and then the amount of water absorption was calculated by the following expression. Similarly, each dried product of 3.0 g was dipped in the distilled water of 500 g at 90° C. for three minutes to restore and swell the dried products. Then, the amount of water absorption was calculated.

Amount of water absorption (time)=weight of gel after restoration and swelling/weight of dried product [Expression 3]

Further, the gel after restoration and swelling in the distilled water at 90° C. was put into the boiling water for three minutes. Then, the gel was observed whether the gel maintained the shape or not by visual check. Specifically, whether the gel after restoration and swelling was melted and turned into a solution or not, was decayed or not, and the surface of the gel was melted and became an irregular shape or not were observed. Further, the oral sensation was checked.

(3) Melting Rate (%)

After dipping each dried product of 2.0 g produced in the working examples or the comparative examples were dipped in the distilled water of 300 g at 95° C. for five minutes, only a solid material was removed. After the distilled water from which the solid material was removed was vaporized and dried, the weight (g) of the solid material melted from the dried product was measured. The amount of monovalent cation (Na) (g) and the amount of divalent cation (Ca) (g) were subtracted from this solid material weight. The amount of melted agar or sodium alginate was measured by the following formula. The amount of monovalent cation (Na) and the amount of divalent cation (Ca) were measured using the ICP similar to (1).

Melting ratio (%)=((solid material weight melted from the dried product (g)−amount of monovalent cation (Na)(g)−amount of divalent cation (Ca)(g))×100)/(Amount of dried product (2.0 g)) [Expression 4]

Experimental Example 1

Change Depending on Calcium Content (1)

The dried product made of the agar and the alginate with the combinations listed in Table 1 was produced. Specifically, the agar (1) and the sodium alginate (1) were dispersed and dissolved in water. Then, the materials was warmed to 110° C. with an autoclave and then was dissolved. Further, the sodium chloride shown in Table 2 was added. This water was filled in a container and then was cooled and coagulated. Afterward, the coagulation was cut off into the noodle shape (3 mm square×20 cm). The noodle-shaped pectized materials were dipped in a calcium chloride solution at concentrations listed in Table 2 for five hours. At this time, the amount of calcium chloride liquid was designed to be 1000 g while an amount of the gel was designed to be 500 g. After the dipping, the noodle-shaped gel was extracted and was dried at 60° C. Thus, the dried products formed of the agar and the alginate of Working examples 1 to 5 and Comparative examples 2 and 3 were produced. The dried product not using the sodium chloride was also similarly produced (Comparative example 1). The mol ratio of the calcium and the mol ratio of the sodium with respect to the monomeric unit of the alginate contained in the obtained dried product and the mol ratio of the calcium to the mol ratio of the sodium are listed in Table 2. The results of the amount of water absorption, maintenance of the shape, and the oral sensation are listed in Table 3.

The notes described in the following all tables are as follows.
1: Mol ratio of the calcium with respect to the monomeric unit of the alginate contained in the dried product
2: Mol ratio of the sodium with respect to the monomeric unit of the alginate contained in the dried product
3: The gel is decayed and therefore cannot be measured. (Note): The extremely slight amount of melting was observed; however, the amount did not affect the appearance and the oral sensation.
4: Ca: Na (mol ratio) in dried product
5: The gel is decayed and therefore cannot be measured.
6: Since the agar is too little, the gel was poorly formed after cooling. Accordingly, the gel cannot be formed into a noodle shape.
7: The mol ratio of potassium with respect to the monomeric unit of the alginate contained in the dried product
8: The mol ratio of ammonium with respect to the monomeric unit of the alginate contained in the dried product
9: Ca: K or $NH_3$ (mol ratio) in the dried product Working example 20 and Comparative example 11 are Ca: K Working Example 21 and Comparative Example 12 ARE Ca: $NH_3$

TABLE 1

| | |
|---|---|
| Agar (1) | 80 g |
| Sodium alginate (1) | 320 g |
| Water | Total 20000 g |

TABLE 2

| | Comparative example 1 | Comparative example 2 | Comparative example 3 | Working example 1 | Working example 2 | Working example 3 | Working example 4 | Working example 5 |
|---|---|---|---|---|---|---|---|---|
| Amount of added sodium chloride (g) | — | 76 | 50 | 90 | 64 | 69 | 73 | 86 |
| Concentration of calcium chloride liquid (%) | 0.36 | 0.82 | 0.05 | 0.08 | 0.27 | 0.36 | 0.45 | 0.54 |
| Mol ratio of calcium (*1) | 0.32 | 0.33 | 0.03 | 0.05 | 0.21 | 0.23 | 0.25 | 0.30 |
| Mol ratio of sodium (*2) | 0.05 | 0.28 | 0.20 | 0.43 | 0.24 | 0.26 | 0.27 | 0.31 |
| Ca:Na | 1:0.16 | 1:0.85 | 1:6.67 | 1:8.60 | 1:1.14 | 1:1.13 | 1:1.08 | 1:1.03 |

TABLE 3

| | Amount of water absorption at 20° C. (time) | Amount of water absorption at 90° C. (time) | Maintenance of shape | Oral sensation |
|---|---|---|---|---|
| Comparative example 1 | 3 | 13 | Shape maintained | Poor swelling and hard |
| Comparative example 2 | 4 | 14 | Shape maintained | Poor swelling and hard |
| Comparative example 3 | 103 | *3 | — | Too soft and fragile |
| Working example 1 | 56 | 94(Note) | Shape maintained | Soft gel |
| Working example 2 | 45 | 77 | Shape maintained | Gel with appropriate hardness |
| Working example 3 | 49 | 80 | Shape maintained | Gel with appropriate hardness |

TABLE 3-continued

| | Amount of water absorption at 20° C. (time) | Amount of water absorption at 90° C. (time) | Maintenance of shape | Oral sensation |
|---|---|---|---|---|
| Working example 4 | 50 | 72 | Shape maintained | Gel with appropriate hardness |
| Working example 5 | 40 | 61 | Shape maintained | Gel with appropriate hardness |

As described above, the dried product where the divalent cation was 0.04 to 0.30 mol per mol with respect to the monomeric unit of the alginate and the mol ratios of the calcium and the sodium was 1.0:0.35 to 1.0:8.70 exhibited high water absorption magnification and also excellent oral sensation.

Experimental Example 2

Change Depending on Calcium Content (2), in the Case where Sodium Chloride Content is Same The dried product made of the agar and the alginate with the combinations listed in Table 4 was produced. Specifically, the agar (2) and the sodium alginate (2) were dispersed and dissolved in water. Then, the materials were warmed, boiled, and dissolved. This water was filled in a container and then was cooled and coagulated. Afterward, the coagulation was cut off into the noodle shape (3 mm square×20 cm). The noodle-shaped pectized materials were dipped in a mixed solution of the calcium chloride and the sodium chloride at concentrations listed in Table 5 for five hours. At this time, the amount of calcium chloride liquid was designed to be 1000 g while an amount of the gel was designed to be 500 g. After the dipping, the noodle-shaped gel was extracted and was dried at 60° C. to form the dried product. Thus, the dried products formed of the agar and the alginate of Working examples 6 to 9 and Comparative examples 5 to 7 were produced. The dried product not using the sodium chloride was also similarly produced (Comparative example 4). The physical properties of the obtained dried product was measured similar to Experimental example 1. The measurement results are listed in Table 6.

TABLE 4

| Agar (2) | 60 g |
|---|---|
| Sodium alginate (2) | 340 g |
| Water | Total 20000 g |

TABLE 5

| | Comparative example 4 | Comparative example 5 | Comparative example 6 | Comparative example 7 | Working example 6 | Working example 7 | Working example 8 | Working example 9 |
|---|---|---|---|---|---|---|---|---|
| Concentration of calcium chloride liquid (%) | 0.30 | 0.85 | 0.05 | 0.54 | 0.07 | 0.27 | 0.36 | 0.45 |
| Concentration of sodium chloride (%) | — | 0.2 | 0.2 | 0.2 | 0.2 | 0.2 | 0.2 | 0.2 |
| Mol ratio of calcium (*1) | 0.28 | 0.33 | 0.02 | 0.32 | 0.04 | 0.22 | 0.24 | 0.27 |
| Mol ratio of sodium (*2) | 0.06 | 0.21 | 0.22 | 0.21 | 0.22 | 0.21 | 0.21 | 0.21 |
| Ca:Na | 1:0.21 | 1:0.64 | 1:11.0 | 1:0.66 | 1:5.50 | 1:0.95 | 1:0.88 | 1:0.78 |

TABLE 6

| | Amount of water absorption at 20° C. (time) | Amount of water absorption at 90° C. (time) | Maintenance of shape | Oral sensation |
|---|---|---|---|---|
| Comparative example 4 | 3 | 14 | Shape maintained | Poor swelling and hard |
| Comparative example 5 | 4 | 15 | Shape maintained | Poor swelling and hard |
| Comparative example 6 | 105 | *3 | — | Too soft and fragile |
| Comparative example 7 | 9 | 16 | Shape maintained | Poor swelling and hard |
| Working example 6 | 57 | 96(Note) | Shape maintained | Soft gel |
| Working example 7 | 47 | 79 | Shape maintained | Gel with appropriate hardness |
| Working example 8 | 50 | 83 | Shape maintained | Gel with appropriate hardness |
| Working example 9 | 30 | 55 | Shape maintained | Slightly hard gel |

As described above, the dried product where the divalent cation was within the range of 0.04 to 0.30 mol per mol with respect to the monomeric unit of the alginate exhibited high water absorption magnification and also excellent oral sensation.

Experimental Example 3

Change Depending on Weight Ratios of Agar to Alginate

The dried product made of the agar and the alginate with the combinations (weight %) listed in Table 7 was produced. Specifically, the agar (3) and the sodium alginate (3) were dispersed and dissolved in water. Then, the materials were warmed, boiled, and dissolved (amount of production: 1000 g). This water was filled in a container and then was cooled and coagulated. Afterward, the coagulation was cut off into the noodle shape (3 mm square×10 cm). The noodle-shaped pectized materials of 500 g were dipped in a calcium chloride solution of 1000 g at a concentration of 0.20 weight % for five hours. After the dipping, the noodle-shaped gel was extracted and was dried at 60° C. to form the dried product. A salt of 0.5 g was dissolved in the water of 10 g. The water was sprayed to the dried product and then the dried product was further dried. Thus, the dried products formed of the agar and the alginate of Working examples 10 to 14 and Comparative examples 8 and 9 were produced. The physical properties of the obtained dried product was measured similar to Experimental example 1. The measurement results are listed in Table 8.

As described above, the dried product where the weight ratio of the agar to the weight ratio of the sodium alginate was 1:1 to 1:20 exhibited high water absorption magnification and also excellent oral sensation.

Experimental Example 4

Change Depending on Use Concentrations of Agar and Alginate

The dried product made of the agar and the alginate with the combinations (weight %) listed in Table 9 was produced. Specifically, the agar (4) and the sodium alginate (3) were dispersed and dissolved in water. Then, the materials were warmed, boiled, and dissolved (amount of production: 1000 g). This water was filled in a container and then was cooled and coagulated. Afterward, the coagulation was cut off into the cube shape (5 mm square×5 mm square). The cube-shaped pectized materials of 500 g were dipped in a calcium chloride solution of 1000 g at a concentration of 0.18 weight % for five hours. After the dipping, the cube-shaped gel was extracted and was dipped in the 0.2% sodium chloride solution of 1000 g for five hours. Afterwards, the cube-shaped gel was extracted, vacuum freeze-drying was performed on the gel at 40° C. to form the dried product. Thus, the dried products formed of the agar and the alginate of Working examples 15 to 18 were produced. The physical properties of the obtained dried product was measured similar to Experimental example 1. The measurement results are listed in Table 10.

TABLE 7

|  | Working example 12 | Working example 13 | Working example 14 | Comparative example 8 | Comparative example 9 |
|---|---|---|---|---|---|
| Agar (3) | 1.00 | 0.20 | 0.10 | 1.90 | 0.05 |
| Sodium alginate (3) | 1.00 | 1.80 | 1.90 | 0.10 | 1.95 |
| Water (Total) | 100 | 100 | 100 | 100 | 100 |

TABLE 8

|  | Amount of water absorption at 20° C. (time) | Amount of water absorption at 90° C. (time) | Maintenance of shape | Oral sensation | Ca (*1) | Na (*2) | Ca:Na (*4) |
|---|---|---|---|---|---|---|---|
| Working example 12 | 58 | 85 | Shape maintained | Gel with appropriate hardness | 0.24 | 0.22 | 1:0.92 |
| Working example 13 | 53 | 85 | Shape maintained | Gel with appropriate hardness | 0.25 | 0.23 | 1:0.92 |
| Working example 14 | 59 | 70 | Shape maintained | Soft gel | 0.25 | 0.23 | 1:0.92 |
| Comparative example 8 | 21 | — | *5 | — | 0.23 | 0.23 | 1:1.00 |
| Comparative example 9 | — | — | *6 | — | 0.22 | 0.23 | 1:1.05 |

TABLE 9

|  | Working example 15 | Working example 16 | Working example 17 | Working example 18 |
|---|---|---|---|---|
| Agar (4) | 0.10 | 0.50 | 1.00 | 2.00 |
| Sodium alginate (3) | 0.10 | 0.50 | 1.00 | 2.00 |
| Water (Total) | 100 | 100 | 100 | 100 |

TABLE 10

|  | Amount of water absorption at 20° C. (time) | Amount of water absorption at 90° C. (time) | Maintenance of shape | Oral sensation | Ca (*1) | Na (*2) | Ca:Na (*4) |
|---|---|---|---|---|---|---|---|
| Working example 15 | 47 | 80 | Shape maintained | Gel with appropriate hardness | 0.13 | 0.18 | 1:1.38 |
| Working example 16 | 49 | 82 | Shape maintained | Gel with appropriate hardness | 0.15 | 0.20 | 1:1.33 |
| Working example 17 | 50 | 85 | Shape maintained | Gel with appropriate hardness | 0.17 | 0.22 | 1:1.29 |
| Working example 18 | 48 | 86 | Shape maintained | Gel with appropriate hardness | 0.21 | 0.30 | 1:1.24 |

Experimental Example 5

In the Case where Gel is Dipped in Salt

The dried product made of the agar (3) and the sodium alginate (2) was produced. Specifically, the agar (3) of 6 g and the sodium alginate (3) of 14 g were dispersed and dissolved in water. Then, the materials were warmed, boiled, and dissolved (amount of production: 1000 g). This water was filled in a container and then was cooled and coagulated. Afterward, the coagulation was cut off into the plate shape (15 mm×30 mm×H5 mm). The plate-shaped pectized materials of 500 g were dipped in a calcium chloride solution of 1000 g at a concentration of 0.15 weight % for five hours. After the dipping, the plate-shaped gel was extracted and was dipped in 0.2% sodium chloride solution of 1000 g for five hours. Afterwards, the plate-shaped gel was extracted, and vacuum drying was performed on the gel at 50° C. Thus, the dried product formed of the agar and the alginate of Working example 19 was produced. The physical properties of the obtained dried product was measured similar to Experimental example 1. The measurement results are listed in Table 11. The dried product not dipped in the sodium chloride solution was also similarly produced as Comparative example 10.

TABLE 11

|  | Amount of water absorption at 20° C. (time) | Amount of water absorption at 90° C. (time) | Maintenance of shape | Oral sensation | Ca (*1) | Na (*2) | Ca:Na (*4) |
|---|---|---|---|---|---|---|---|
| Working example 19 | 47 | 84 | Shape maintained | Gel with appropriate hardness | 0.20 | 0.20 | 1:1 |
| Comparative example 10 | 3 | 11 | Shape maintained | Poor swelling and hard | 0.30 | 0.05 | 1:0.16 |

As described above, the dried product that was not dipped in the sodium chloride solution and Na of Ca: Na was 1.0:0.35 or less exhibited poor water absorption and also poor oral sensation.

Experimental Example 6

In the Case where Potassium Alginate or Ammonium Alginate is Used

The dried product made of the agar and the alginate with the combinations (weight %) listed in Table 12 was produced. Specifically, the agar (3) and the alginate shown in Table 12 were dispersed and dissolved in water. Then, the materials were warmed, boiled, and dissolved (amount of production: 1000 g for each). This water was filled in a container at a height of 10 mm and then was cooled and coagulated. Then, the coagulation was dipped in a calcium lactate solution of 1000 g at a concentration of 0.8% for ten hours. After the dipping, the pectized material was extracted and cut off into the cube shape (5 mm square×5 mm square). In Working example 20, the cube-shaped gels were dipped in a 0.6% potassium chloride solution of 1000 g for five hours. In Working example 21, the cube-shaped gels were dipped in a 0.5% ammonium chloride solution of 1000 g for five hours. After that, the cube-shaped gel was extracted, frozen, and then dried at 50° C. Thus, the dried products formed of the agar and the alginate of Working examples 20 and 21 were produced. The physical properties of the obtained dried product was measured similar to Experimental example 1. The measurement results are listed in Table 12. The dried products not dipped in the potassium chloride solution and the ammonium chloride solution were also similarly produced as Comparative examples 11 and 12.

TABLE 12

|  | Working example 20 | Working example 21 | Comparative example 11 | Comparative example 12 |
|---|---|---|---|---|
| Agar (3) | 7 | 7 | 7 | 7 |
| Potassium alginate (1) | 13 | — | 13 | — |

TABLE 12-continued

| | Working example 20 | Working example 21 | Comparative example 11 | Comparative example 12 |
|---|---|---|---|---|
| Ammonium alginate (1) | — | 13 | — | 13 |
| Water (Total) | 100 | 100 | 100 | 100 |

TABLE 13

| | Amount of water absorption at 20° C. (time) | Amount of water absorption at 90° C. (time) | Maintenance of shape | Oral sensation | Ca (*1) | K (*7) | NH$_3$ (*8) | Ca:K or Ca:NH$_3$ (*9) |
|---|---|---|---|---|---|---|---|---|
| Working example 20 | 48 | 72 | Shape maintained | Gel with appropriate hardness | 0.18 | 0.61 | — | 1:3.49 |
| Working example 21 | 49 | 76 | Shape maintained | Gel with appropriate hardness | 0.18 | — | 0.63 | 1:3.50 |
| Comparative example 11 | 2 | 7 | Shape maintained | Poor swelling and hard | 0.26 | 0.05 | — | 1:0.19 |
| Comparative example 12 | 2 | 7 | Shape maintained | Poor swelling and hard | 0.25 | — | 0.05 | 1:0.20 |

As described above, the dried product where K of Ca:K or NH$_3$ of Ca:NH$_3$ was 1.0:0.35 or less exhibited poor water absorption and also poor oral sensation.

Experimental Example 7

Granular Product

The dried product made of the agar (2) and the sodium alginate (1) was produced. Specifically, the agar (2) of 10 g and the alginate (1) of 10 g were dispersed and dissolved in water. Then, the materials were warmed, boiled, and dissolved (amount of production: 1000 g). After cooling this solution of 500 g at 60° C., the solution was dropped from a hole in diameter of 2 mm to a metal plate cooled to 10° C. Thus, the solution was cooled and coagulated in grains. This granular-shaped pectized material was dipped in the 0.2% calcium chloride solution of 1000 g at 20° C. for one hour. Then, the granular-shaped gel was extracted. Further, the granular-shaped gel was dipped in 0.5% sodium chloride solution of 1000 g for 0.5 hours. Afterwards, wind was blown to the extracted granular-shaped gel at 80° C. for drying. Thus, the dried product formed of the agar and the alginate of Working example 22 was produced. The physical properties of the obtained dried product was measured similar to Experimental example 1. The measurement results are listed in Table 14. The dried product not dipped in the sodium chloride solution was also similarly produced as Comparative example 13.

As described above, the dried product where Na of Ca: Na was 1.0:0.35 or less exhibited poor water absorption and also poor oral sensation.

Experimental Example 8

Resistance Properties Against Retort

After water of 300 g was added to the dried products of 2 g obtained at Working examples 1 to 22 and Comparative examples 1 to 12 (excluding Comparative example 9) and sealed, a retort process was performed at 121° C. for 20 minutes. The shape and the oral sensation of the composition after the process at 20° C. were examined and are listed in Table 15.

TABLE 15

| | Shape | Oral sensation |
|---|---|---|
| Working example 1 | Maintained | Soft gel |
| Working example 2 | Maintained | Gel with appropriate hardness |
| Working example 3 | Maintained | Gel with appropriate hardness |
| Working example 4 | Maintained | Gel with appropriate hardness |
| Working example 5 | Maintained | Gel with appropriate hardness |
| Working example 6 | Maintained | Soft gel |
| Working example 7 | Maintained | Gel with appropriate hardness |
| Working example 8 | Maintained | Gel with appropriate hardness |
| Working example 9 | Maintained | Gel with appropriate hardness |
| Working example 12 | Maintained | Gel with appropriate hardness |
| Working example 13 | Maintained | Gel with appropriate hardness |
| Working example 14 | Maintained | Soft gel |
| Working example 15 | Maintained | Gel with appropriate hardness |
| Working example 16 | Maintained | Gel with appropriate hardness |
| Working example 17 | Maintained | Gel with appropriate hardness |
| Working example 18 | Maintained | Gel with appropriate hardness |
| Working example 19 | Maintained | Gel with appropriate hardness |
| Working example 20 | Maintained | Gel with appropriate hardness |
| Working example 21 | Maintained | Gel with appropriate hardness |
| Working example 22 | Maintained | Gel with appropriate hardness |
| Comparative example 1 | Maintained | Poor swelling and hard |
| Comparative example 2 | Maintained | Poor swelling and hard |
| Comparative example 3 | Break into pieces | — |

TABLE 14

| | Amount of water absorption at 20° C. (time) | Amount of water absorption at 90° C. (time) | Maintenance of shape | Oral sensation | Ca (*1) | Na (*2) | Ca:Na (*4) |
|---|---|---|---|---|---|---|---|
| Working example 22 | 51 | 71 | Shape maintained | Gel with appropriate hardness | 0.14 | 0.28 | 1:2.00 |
| Comparative example 13 | 2 | 9 | Shape maintained | Poor swelling and hard | 0.31 | 0.05 | 1:0.16 |

TABLE 15-continued

|  | Shape | Oral sensation |
|---|---|---|
| Comparative example 4 | Maintained | Poor swelling and hard |
| Comparative example 5 | Maintained | Poor swelling and hard |
| Comparative example 6 | Break into pieces | — |
| Comparative example 7 | Maintained | Poor swelling and hard |
| Comparative example 8 | Break into pieces | — |
| Comparative example 10 | Maintained | Poor swelling and hard |
| Comparative example 11 | Maintained | Poor swelling and hard |
| Comparative example 12 | Maintained | Poor swelling and hard |

As described above, the composition using the dried product made of the agar and the alginate of the present invention maintained its shape and preferable oral sensation even after the retort process.

Experimental Example 9

In the Case of Only Alginate

The dried product made of the alginate with the combinations (weight %) listed in Table 16 was produced. Specifically, the sodium alginate was dispersed and dissolved in water. Then, the material was warmed, boiled, and dissolved (amount of production: 1000 g). This solution of 500 g was extruded from an orifice in a diameter of 5 mm to 0.2% calcium chloride solution of 1000 g and then was dipped for five hours. After the dipping, the noodle-shaped gel was extracted and then was dipped in 0.2% sodium chloride solution of 1000 g for five hours. Afterwards, the noodle-shaped gel was extracted, vacuum freeze-drying was performed on the gel at 40° C. to form the dried product. Thus, the dried products made of the alginate of Comparative examples 13 to 16 were produced. The physical properties of the obtained dried product was measured similar to Experimental example 1. The measurement results are listed in Table 17.

TABLE 16

|  | Comparative example 13 | Comparative example 14 | Comparative example 15 | Comparative example 16 |
|---|---|---|---|---|
| Sodium alginate (1) | 0.5 | 1.5 | — | — |
| Sodium alginate (3) | — | — | 0.5 | 1.5 |
| Water (Total) | 100 | 100 | 100 | 100 |

TABLE 17

|  | Amount of water absorption at 20° C. (time) | Amount of water absorption at 90° C. (time) | Maintenance of shape | Oral sensation | Ca (*1) | Na (*2) | Ca:Na (*4) |
|---|---|---|---|---|---|---|---|
| Comparative example 13 | 5 | 8 | Shape maintained | Poor swelling and hard | 0.19 | 0.26 | 1:1.39 |
| Comparative example 14 | 7 | 9 | Shape maintained | Poor swelling and hard | 0.22 | 0.29 | 1:1.32 |
| Comparative example 15 | 4 | 7 | Shape maintained | Poor swelling and hard | 0.18 | 0.28 | 1:1.56 |
| Comparative example 16 | 5 | 10 | Shape maintained | Poor swelling and hard | 0.21 | 0.30 | 1:1.43 |

As described above, assume the case of the dried product that does not contain the agar and contains only the alginate. The dried product contains the salt of monovalent cation and the salt of divalent cation. The divalent cation is 0.04 to 0.30 mol per mol and further the monovalent cation is 0.10 to 0.70 mol per mol with respect to the monomeric unit of the alginate. Even the case where the mol ratio of the divalent cation to the monovalent cation was 1.0:0.35 to 1.0:8.70, the dried product exhibited poor imbibition and also poor oral sensation.

Working Example 23

Kudzu Starch Noodle-Like Dessert

The noodle-shaped dried product of 10 g produced in Working example 2 was dipped in hot water (80° C.) of 2000 g for ten minutes. The dried product was reconstituted in hot water, and then was cooled to 10° C. The weight was increased to 70 times. Black syrup was applied to the dried product. Thus, a food product like the kudzu starch noodles was produced. The kudzu starch noodles with resilient, preferable oral sensation was formed. Since this does not use the starch, there is no need to worry about aging of starch. The dried product also stands against thermal sterilization, ensuring a long-term distribution.

Working Example 24

Ramen

The ramen soup of 300 g at 80° C. was added to the noodle-shaped dried product of 5 g produced at Working example 1. After three minutes, the resilient ramen-shaped food product that was not melted was produced. Since wheat is not used, the food product is a low-calorie. Moreover, the food product is a diet food free from allergies.

Working Example 25

Salad

The cube-shaped dried product of 5 g produced at Working example 16 was put into water of 500 g at 20° C. and swollen for 20 minutes. When measuring the weight, the product was swollen to 58 times. Extra water was drained from the dice gel and the dice gel was mixed into vegetable salad. This made the vegetable salad with various oral sensations.

Working Example 26

Hot-Pot Dish Ingredients

The plate-shaped dried product of 5 g produced at Working example 19 was put into a pot soup of 1 L (salt: 1.5%), and was boiled and heated for 20 minutes. The swollen gel-shaped composition was extracted and the weight was measured. The composition was swollen to 40 times and the melting was not confirmed. This swollen gel became a healthy gel with new oral sensation.

Working Example 27

Beverage with Sarcocarp-Like Jelly

The granular-shaped dried product of 5 g produced at Working example 22 was put into hot water of 500 g at 90° C. and was swollen for ten minutes. When measuring the weight, the product was swollen to 70 times. When cooling the product to 10° C., the product became an oral sensation like grape sarcocarp. This granular-shaped gel was mixed into a commercially available grape juice by 10%. Then, the grape juice was sterilized at 90° C. for ten minutes and then cooled. Thus, a juice-like beverage with grape sarcocarps was produced.

Working Example 28

Fruit Punch

With the similar method to the method for production at Working example 21, the dried product where only the size of the cube was changed so as to be produced at the side of 10 mm for one side was put into a plastic cup container together with fruits of a mandarin orange, a pineapple, and a peach that were preserved in syrup. In addition to the syrup, the plastic cup container was hermetically sealed with a top film. After low-temperature sterilization in hot water at 85° C. for 30 minutes, the product was cooled in a water tank. When opened, a fruit punch where no melting occurs and had good jelly oral sensation was produced.

Working Example 29

ZENZAI with Jelly

The granular-shaped dried product of 1 g produced at Working example 22 was added to a commercially available ZENZAI (sugar content: 38) of 200 g. The product was filled in a container for retort sterilization and was hermetically sealed. Thus, the retort sterilization was performed at 121° C. for 20 minutes. When dipped in boiling water again after cooling for three minutes and then opened, the granular-shaped dried product became granular-shaped jelly. Thus, the product was not melted and was able to be eaten at good taste. Thus, the ZENZAI with jelly with various oral sensations and that was able to be stored for a long period was produced.

Working Example 30

Stir-Fried Food Like Mabo Glass Noodles

The noodle-shaped dried product of 5 g produced at Working example 13 was dipped in boiling water of 1 L for ten minutes and then the dried product was caused to absorb water and swell. This resulted in forming a noodle-shaped pectized material where no melting occurs and with oral sensation of appropriate chewiness. This pectized material was mixed with a commercially available premix for mabo glass noodles (retort pouch product) and then heated and cooked. This produced a stir-fried food like mabo glass noodles where the shape of the noodle-shaped gel was held and not melted. Moreover, this produced the stir-fried food like mabo glass noodles with good oral sensation of different crisp from glass noodles. Moreover, the noodle-shaped gel of the present invention is a dietary fiber made of the agar and the alginate different from the starch, which is the constituent of the glass noodles. Accordingly, the noodle-shaped gel becomes a healthy food useful for calorie control or a similar purpose.

Working Example 31

Eggplant and Jelly Dressed with Mustard (Pickles)

The plate-shaped dried product of 5 g produced at Working example 19 was dipped in boiling water of 1 L for ten minutes and then the dried product was caused to absorb water and swell. This resulted in forming a plate-shaped pectized material where no melting occurs and with oral sensation of appropriate chewiness. This pectized material was mixed with the eggplant using commercially available mustard dressing premix. Thus, the eggplant with jelly using the agar and the alginate of the present invention dressed with mustard was produced. Mixing the transparent jelly with the eggplant produced novel pickles with beautiful looking and various oral sensations. The dried composition of the present invention was not melted even in the boiling water and the shape of the dried composition was held. Accordingly, the dried composition can be thermally sterilized and therefore can be used for goods such as light pickles where keeping for a long time is important without a problem.

Working Example 32

Yoghurt with Grained Jelly

The granular-shaped dried product of 1 g produced at Working example 22 was dipped in boiling water of 500 mL for five minutes and then the dried product was caused to absorb water and swell. This resulted in forming a granular pectized material where no melting occurs and with oral sensation of appropriate chewiness. This pectized material was mixed into commercially available yoghurt that had been previously fermented. This produced new yoghurt where the gel with appropriate crisp was added. This yoghurt contained the dietary fiber, which is not contained in usual yoghurts. The yoghurt had new functionality where prebiotics was added to probiotics. Additionally, sterilization by boiling and retort can be performed on the product of the present invention. Accordingly, the product of the present invention is also applicable to goods, such as the yoghurt, that dislike a mixture of unwanted bacteria.

Working Example 33

Ice Cream with Grained Jelly Source

The granular-shaped dried product of 1 g produced at Working example 22 was put into 35% sucrose water of 500 mL, boiled for ten minutes, and then the dried product was caused to absorb water and swell. This resulted in forming a granular pectized material (sugar content: 30) where no melting occurs and with oral sensation of appropriate chewiness. The pectized material was added in ice cream produced by the usual method after terminating overrun. Then, the ice cream was filled in a container and was frozen. This ice cream became the granular-shaped gels with appropriate chewiness where the granular-shaped pectized materials were defrosted when eaten. Thus, the ice cream having new variations and containing the dietary fiber, which are unlikely to the conventional ice cream, was produced.

Working Example 34

Beef Bowl with Retort Pouch

The noodle-shaped dried product of 1.5 g produced at Working example 3 was dipped in boiling water of 1 L for ten minutes and then the dried product was caused to absorb water and swell. This resulted in forming a noodle-shaped pectized material where no melting occurs and with oral sensation of appropriate chewiness. Separate from this, main ingredients of the beef bowl was produced (200 g) by the usual method. However, the konnyaku strings were not used, but the noodle-shaped pectized material produced above was used. The pectized material was put into a retort bag. Then, retort sterilization was performed on the pectized material at 121° C. for 20 minutes. After the cooling, the pectized material was dipped in the boiling water again for three minutes and opened. The noodle-shaped gel held its shape and was not melted. Moreover, the noodle-shaped gel exhibited good oral sensation and appropriate crisp different from the konnyaku strings. Thus, the beef bowl with new variation was produced.

Working Example 35

Wrap of Shaomai

Instead of forming the dried product into the noodle shape with the combinations of Experimental example 1, except for forming the dried product into the sheet shape at Φ10 cm and a thickness of 2 mm, the dried product was processed similar to Working example 2. Thus, the sheet-shaped dried product was produced. Ten sheets of the sheet-shaped dried products were dipped in the boiling water of 500 mL for five minutes and then were caused to absorb water and swell. This resulted in forming a sheet-shaped pectized material where no melting occurs and with oral sensation of appropriate chewiness. The main ingredients of the shaomai that has been produced separately were wrapped with this sheet-shaped pectized material and then steamed for ten minutes. The sheet was not melted and kept its shape. Moreover, the shaomai that was transparent and had appropriate crisp and oral sensation, which is unlikely to the conventional shaomai, was produced.

Working Example 36

Wrap of Spring Roll

Instead of forming the dried product into the noodle shape with the combinations of Experimental example 1, except for forming the dried product into the sheet shape at 10 cm×10 cm×2 mm at a thickness, the dried product was processed similar to Working example 4. Thus, the sheet-shaped dried product was produced. The ten sheets of sheet-shaped dried products were dipped in the boiling water of 500 mL for five minutes and then were caused to absorb water and swell. This resulted in forming a sheet-shaped pectized material where no melting occurs and with oral sensation of appropriate chewiness. The main ingredients of a spring roll that had been separately produced, heated, and cooked, were wrapped with this sheet-shaped pectized material. Then, a fresh spring roll was produced. Thus, a new fresh spring roll that was transparent and with the oral sensation, which is unlikely to the conventional fresh spring roll, was produced. Further, this spring roll was heated with a steamer. This formed the spring roll where the wrap of spring roll was not melted and still transparent; therefore, the spring roll was eaten in a warm state.

Experimental Example 10

In the Case of Changing Mol Ratios of Divalent Cation and Monovalent Cation (1)

The dried product made of the agar and the alginate with the combinations listed in Table 18 was produced. Specifically, the agar (3) and the sodium alginate (3) were dispersed and dissolved in water. Then, the materials were warmed to 105° C. with an autoclave and then were dissolved. Further, the sodium chlorides shown in Tables 19 and 20 were added. This water was filled in a container and then was cooled and coagulated. Afterward, the coagulation was cut off into the noodle shape (4 mm square×15 cm). The noodle-shaped pectized materials were dipped in a calcium chloride solution at concentrations listed in Tables 19 and 20 for hours listed in Tables 19 and 20. At this time, the amount of calcium chloride liquid was designed to be 1000 g while an amount of the gel was designed to be 500 g. After the dipping, the noodle-shaped gel was extracted and was dried at 60° C. Thus, the dried products formed of the agar and the alginate of Working examples 37 to 43 and Comparative examples 17 to 23 were produced. The mol ratio of the calcium and the mol ratio of the sodium with respect to the monomeric unit of the alginate contained in the obtained dried product and the ratios are listed in Tables 19 and 20. The results of the amount of water absorption, maintenance of the shape, and the oral sensation are listed in Table 21.

TABLE 18

| Agar (3) | 80 g |
| Sodium alginate (3) | 320 g |
| Water | Total 20000 g |

TABLE 19

| | Comparative example 17 | Comparative example 18 | Comparative example 19 | Working example 37 | Working example 38 | Working example 39 | Working example 40 |
| --- | --- | --- | --- | --- | --- | --- | --- |
| Amount of added sodium chloride (g) | 20 | 15 | 25 | 30 | 30 | 60 | 70 |

TABLE 19-continued

|  | Comparative example 17 | Comparative example 18 | Comparative example 19 | Working example 37 | Working example 38 | Working example 39 | Working example 40 |
|---|---|---|---|---|---|---|---|
| Concentration of calcium chloride liquid (%) | 0.33 | 0.36 | 0.30 | 0.28 | 0.30 | 0.15 | 0.20 |
| Dip hour of calcium chloride (hour) | 5 | 2 | 4 | 4 | 2 | 3 | 3 |
| Mol ratio of calcium (*1) | 0.29 | 0.29 | 0.29 | 0.29 | 0.26 | 0.11 | 0.15 |
| Mol ratio of sodium (*2) | 0.10 | 0.10 | 0.10 | 0.11 | 0.11 | 0.22 | 0.59 |
| Ca:Na | 1:0.34 | 1:0.34 | 1:0.34 | 1:0.38 | 1:0.42 | 1:2.0 | 1:3.9 |

TABLE 20

|  | Working example 41 | Working example 42 | Working example 43 | Comparative example 20 | Comparative example 21 | Comparative example 22 | Comparative example 23 |
|---|---|---|---|---|---|---|---|
| Amount of added sodium chloride (g) | 55 | 80 | 75 | 95 | 105 | 95 | 120 |
| Concentration of calcium chloride liquid (%) | 0.10 | 0.13 | 0.10 | 0.12 | 0.15 | 0.10 | 0.18 |
| Dip hour of calcium chloride (hour) | 5 | 5 | 5 | 5 | 5 | 5 | 5 |
| Mol ratio of calcium (*1) | 0.04 | 0.09 | 0.06 | 0.05 | 0.05 | 0.04 | 0.06 |
| Mol ratio of sodium (*2) | 0.19 | 0.60 | 0.52 | 0.44 | 0.45 | 0.36 | 0.53 |
| Ca:Na | 1:4.8 | 1:6.6 | 1:8.6 | 1:8.8 | 1:8.9 | 1:9.0 | 1:8.9 |

TABLE 21

|  | Amount of water absorption at 20° C. (time) | Amount of water absorption at 90° C. (time) | Maintenance of shape | Oral sensation |
|---|---|---|---|---|
| Comparative example 17 | 3 | 13 | Shape maintained | Poor swelling and hard |
| Comparative example 18 | 4 | 13 | Shape maintained | Poor swelling and hard |
| Comparative example 19 | 3 | 13 | Shape maintained | Poor swelling and hard |
| Working example 37 | 19 | 40 | Shape maintained | Slightly hard gel but has hardness that does not cause problem |
| Working example 38 | 41 | 70 | Shape maintained | Gel with appropriate hardness |
| Working example 39 | 53 | 74 | Shape maintained | Gel with appropriate hardness |
| Working example 40 | 55 | 77 | Shape maintained | Gel with appropriate hardness |
| Working example 41 | 60 | 88(Note) | Shape maintained | Soft gel |
| Working example 42 | 60 | 90(Note) | Shape maintained | Soft gel |
| Working example 43 | 61 | 95(Note) | Shape maintained | Soft gel |
| Comparative example 20 | 88 | *3 | — | Too soft and fragile |
| Comparative example 21 | 90 | *3 | — | Too soft and fragile |
| Comparative example 22 | 95 | *3 | — | Too soft and fragile |
| Comparative example 23 | 88 | *3 | — | Too soft and fragile |

As described above, the dried product where the divalent cation was 0.04 to 0.30 mol per mol and further the monovalent cation was 0.10 to 0.70 mol per mol with respect to the monomeric unit of the alginate, and the mol ratio of the calcium to the mol ratio of the sodium was 1.0:0.35 to 1.0:8.70 exhibited high water absorption magnification and also excellent oral sensation. However, the dried product where the mol ratio of the calcium to the sodium was except for 1.0:0.35 to 1.0:8.70 failed to obtain a good result.

Experimental Example 11

In the Case Where Mol Ratios of Divalent Cation and Monovalent Cation are Changed (2)

The dried product made of the agar and the alginate with the combinations listed in Table 22 was produced. Specifically, the agar (4) and the sodium alginate (2) were dispersed and dissolved in water. Then, the materials were warmed to 110° C. with an autoclave and then were dissolved. Further, the sodium chloride shown in Table 23 was added. This water was filled in a container and then was cooled and coagulated. Afterward, the coagulation was cut off into the noodle shape (4 mm square×15 cm). The noodle-shaped pectized materials were dipped in a calcium chloride solution at concentrations listed in Table 23 for hours listed in Table 23. At this time, the amount of calcium chloride liquid was designed to be 1000 g while an amount of the gel was designed to be 500 g. After the dipping, the noodle-shaped gel was extracted and was dried at 60° C. Thus, the dried products formed of the agar and the alginate of Working examples 44 and 45 and Comparative examples 24 to 29 were produced. The mol ratio of the calcium and the mol ratio of the sodium with respect to the monomeric unit of the alginate contained in the obtained dried product and the ratios are listed in Table 23. The results of the amount of water absorption, maintenance of the shape, and the oral sensation are listed in Table 24.

TABLE 22

| Agar (4) | 80 g |
|---|---|
| Sodium alginate (2) | 320 g |
| Water | Total 20000 g |

TABLE 23

|  | Comparative example 24 | Comparative example 25 | Working example 44 | Working example 45 | Comparative example 26 | Comparative example 27 | Comparative example 28 | Comparative example 29 |
|---|---|---|---|---|---|---|---|---|
| Amount of added sodium chloride (g) | 17 | 18 | 55 | 75 | 80 | 15 | 73 | 17 |
| Concentration of calcium chloride liquid (%) | 0.12 | 0.14 | 0.12 | 0.28 | 0.30 | 0.17 | 0.27 | 0.21 |
| Dip hour of calcium chloride (hour) | 4 | 1 | 4 | 4 | 5 | 4 | 4 | 4 |
| Mol ratio of calcium (*1) | 0.03 | 0.03 | 0.04 | 0.25 | 0.31 | 0.05 | 0.28 | 0.15 |
| Mol ratio of sodium (*2) | 0.08 | 0.09 | 0.20 | 0.68 | 0.72 | 0.09 | 0.73 | 0.08 |
| Ca:Na | 1:2.7 | 1:3.0 | 1:5 | 1:2.72 | 1:2.32 | 1:1.8 | 1:2.6 | 1:0.53 |

TABLE 24

|  | Amount of water absorption at 20° C. (time) | Amount of water absorption at 90° C. (time) | Maintenance of shape | Oral sensation |
|---|---|---|---|---|
| Comparative example 24 | 32 | *3 |  | Too soft |
| Comparative example 25 | 35 | *3 |  | Too soft |
| Working example 44 | 58 | 87(Note) | Shape maintained | Soft gel |
| Working example 45 | 52 | 72 | Shape maintained | Gel with appropriate hardness |
| Comparative example 26 | 14 | 109 | Shape maintained | Too soft |
| Comparative example 27 | 28 | *3 |  | Too soft |
| Comparative example 28 | 14 | 107 | Shape maintained | Too soft |
| Comparative example 29 | 12 | 14 | Shape maintained | Poor swelling and hard |

As described above, the dried product where the divalent cation was 0.04 to 0.30 mol per mol and further the monovalent cation was 0.10 to 0.70 mol per mol with respect to the monomeric unit of the alginate, and the mol ratio of the calcium to the mol ratio of the sodium was 1.0:0.35 to 1.0:8.70 exhibited high water absorption magnification and also excellent oral sensation. However, the dried product where the monovalent cation with respect to the monomeric unit of the alginate was except for 0.10 to 0.70 mol per mol failed to obtain a good result.

Experimental Example 12

Measurement of Melting Rate

Using only the agar (1) or the agar (3), the gel with the similar form as Experimental example 3 was produced with the combinations of Table 25 (amount of production: 1000 g). Specifically, the agar was put into water such that the agar (1) was dissolved at 110° C. and the agar (3) was dissolved at 97° C. Then, the agar (1) and the agar (3) were cooled and pectized. The agar (1) and the agar (3) were cut to a predetermined size. The agar (1) and the agar (3) were dried at 60° C., thus obtaining the dried product. Using the agar (3) and the sodium alginate (3), similar to Experimental example 3 with the combinations of Table 25, the dried products made of the agar and the alginate of Comparative examples 33 and 34 were produced. The physical properties of the dried products made of the agar and the alginate of Comparative examples 33 and 34 were measured. The measurement results are listed in Table 25. Melting rates (%) of Working examples 1 to 45 and Comparative examples 1 to 34 were measured. The results of the melting rates are listed in Table 26.

TABLE 25

|  | Comparative example 30 | Comparative example 31 | Comparative example 33 | Comparative example 34 |
|---|---|---|---|---|
| Agar (1) | 2.0 | — | — | — |
| Agar (3) | — | 2.0 | 1.80 | 1.50 |
| Sodium alginate (3) | — | — | 0.20 | 0.50 |
| Water (Total) | 100 | 100 | 100 | 100 |
| Ca(*1) |  |  | 0.23 | 0.24 |
| Na(*2) |  |  | 0.21 | 0.21 |
| Ca:Na(*4) |  |  | 1:0.91 | 1:0.88 |

TABLE 26

| | Melting rate (%) | | Melting rate (%) |
|---|---|---|---|
| Working example 1 | 0.9 | Comparative example 1 | 0.2 |
| Working example 2 | 0.4 | Comparative example 2 | 0.3 |
| Working example 3 | 0.4 | Comparative example 3 | *3 |
| Working example 4 | 0.4 | Comparative example 4 | 0.2 |
| Working example 5 | 0.3 | Comparative example 5 | 0.3 |
| Working example 6 | 0.7 | Comparative example 6 | *3 |
| Working example 7 | 0.4 | Comparative example 7 | 0.9 |
| Working example 8 | 0.4 | Comparative example 8 | *3 |
| Working example 9 | 0.3 | Comparative example 10 | 0.2 |
| Working example 12 | 0.4 | Comparative example 11 | 0.1 |
| Working example 13 | 0.2 | Comparative example 12 | 0.1 |
| Working example 14 | 0.2 | Comparative example 13 | 0.1 |
| Working example 15 | 0.4 | Comparative example 14 | 0.1 |
| Working example 16 | 0.4 | Comparative example 15 | 0.1 |
| Working example 17 | 0.4 | Comparative example 16 | 0.2 |
| Working example 18 | 0.4 | Comparative example 17 | 0.2 |
| Working example 19 | 0.3 | Comparative example 18 | 0.2 |
| Working example 20 | 0.5 | Comparative example 19 | 0.2 |
| Working example 21 | 0.4 | Comparative example 20 | *3 |
| Working example 22 | 0.4 | Comparative example 21 | *3 |
| Working example 37 | 0.3 | Comparative example 22 | *3 |
| Working example 38 | 0.3 | Comparative example 23 | *3 |
| Working example 39 | 0.4 | Comparative example 24 | *3 |
| Working example 40 | 0.5 | Comparative example 25 | *3 |
| Working example 41 | 0.7 | Comparative example 26 | 6.2 |
| Working example 42 | 0.8 | Comparative example 27 | *3 |
| Working example 43 | 0.9 | Comparative example 28 | 5.7 |
| Working example 44 | 0.9 | Comparative example 29 | 0.2 |
| Working example 45 | 0.4 | Comparative example 31 | 8.2 |
| | | Comparative example 32 | 14.6 |
| | | Comparative example 33 | 7.5 |
| | | Comparative example 34 | 6.6 |

As described above, since Comparative examples 31 and 32 are made of only the agar. The agar was melted in hot water (95° C.). Since Comparative examples 33 and 34 used a large amount of agar, the large amount of agar was melted to the hot water (95° C.). This results in a reduction of a product yield.

Experimental Example 13

Comparison with the Case of Using Reaction Retarder

The dried product made of the agar and the alginate with the combinations listed in Table 27 was produced. Specifically, the agar (3) and the sodium alginate (2) were dispersed and dissolved in water. Then, the materials were warmed to 105° C. with an autoclave and then were dissolved. Further, the sodium chloride of 60 g was added. This water was filled in a container and then was cooled and coagulated. Afterward, the coagulation was cut off into the noodle shape (4 mm square×15 cm). The noodle-shaped pectized materials were dipped in a calcium chloride solution at a concentration of 0.15% for three hours. At this time, the amount of calcium chloride liquid was designed to be 1000 g while an amount of the gel was designed to be 500 g. After the dipping, the noodle-shaped gel was extracted and was dried at 60° C. Thus, the dried products formed of the agar and the alginate of Working example 46 was produced.

Separate from this, the agar (3) and the sodium alginate (2) were dispersed and dissolved in water. Then, the materials were warmed to 105° C. with an autoclave and then were dissolved. Further, the sodium chloride of 60 g, the calcium chloride of 30 g, and sodium hexametaphosphate of 54 g were added. This solution was flown to the container and was left for ten hours for pectization. This gel was cut off to the noodle shape (4 mm square×15 cm) and was dried at 60° C. Thus, the dried product made of the agar and the alginate of Comparative example 35 was produced. Further, in Comparative example 35, the dried product to which the sodium chloride of 60 g was not added was also similarly produced to create a dried product of Comparative example 36.

The mol ratio of the calcium and the mol ratio of the sodium with respect to the monomeric unit of the alginate contained in the obtained dried product and the ratios are listed in Table 28. The results of the amount of water absorption, the melting rate, the maintenance of the shape, and the oral sensation are listed in Table 29.

TABLE 27

| | |
|---|---|
| Agar (3) | 80 g |
| Sodium alginate (2) | 320 g |
| Water | Total 20000 g |

TABLE 28

| | Working example 46 | Comparative example 35 | Comparative example 36 |
|---|---|---|---|
| Mol ratio of calcium (*1) | 0.11 | 0.13 | 0.19 |
| Mol ratio of sodium (*2) | 0.22 | 0.24 | 0.12 |
| Ca:Na | 1:2.0 | 1:1.85 | 1:0.63 |

TABLE 29

| | Amount of water absorption at 20° C. (time) | Amount of water absorption at 90° C. (time) | Melting rate (%) | Maintenance of shape | Oral sensation |
|---|---|---|---|---|---|
| Working example 46 | 54 | 72 | 0.5 | Shape maintained | Gel with appropriate hardness |
| Comparative example 35 | 95 | *3 | — | — | Too soft and strong adherability |
| Comparative example 36 | 9 | *3 | — | — | Too soft and fragile gel |

As described above, from the dried product of Working example 46 where the mixed solution containing the agar, the sodium alginate, and the sodium chloride were cooled to form the agar gel and then the agar gel was dipped in the Ca solution and dried, the good result was obtained. However, in Comparative examples 35 and 36 where the reaction retarder was used for the mixed solution containing the agar, the sodium alginate, and the sodium chloride, the alginic acid started pectizing before the agar became completely pectized, and the gel thus formed was dried, the gel was decayed in hot water at 90° C.

Experimental Example 14

In the Case where Kind of Monovalent Cation and Timing of Adding Monovalent Cation were Changed The dried product made of the agar and the alginate with the combinations listed in Table 30 was produced. Specifically, the agar (3) and the sodium alginate (2) were dispersed and dissolved in water. Then, the materials were warmed to 105° C. with an autoclave and then were dissolved. Further, the saline listed in Table 31 was added. This water was filled in a container and then was cooled and coagulated. Afterward, the coagulation was cut off into the noodle shape (4 mm square×15 cm). The noodle-shaped pectized materials were dipped in a calcium chloride solution at a concentration of 0.15% for three hours. At this time, the amount of calcium chloride liquid was designed to be 1000 g while an amount of the gel was designed to be 500 g. After the dipping, the noodle-shaped gel was extracted and was dried at 60° C. Thus, the dried products formed of the agar and the alginate were produced (Working example 47, Comparative examples 37 to 45).

TABLE 31

| | |
|---|---|
| Working example 47 | Sodium chloride 60 g |
| Comparative example 37 | Sodium hexametaphosphate 60 g |
| Comparative example 38 | Sodium hexametaphosphate 30 g |
| Comparative example 39 | Sodium hexametaphosphate 10 g |
| Comparative example 40 | Sodium monohydrogen phosphate 60 g |
| Comparative example 41 | Sodium monohydrogen phosphate 30 g |
| Comparative example 42 | Sodium monohydrogen phosphate 10 g |
| Comparative example 43 | Sodium citrate 60 g |
| Comparative example 44 | Sodium citrate 30 g |
| Comparative example 45 | Sodium citrate 10 g |
| Working example 48 | Sodium hexametaphosphate |
| Working example 49 | Sodium monohydrogen phosphate |
| Working example 50 | Sodium citrate |

TABLE 32

| | Working example 47 | Comparative example 37 | Comparative example 38 | Comparative example 39 | Comparative example 40 |
|---|---|---|---|---|---|
| Mol ratio of calcium (*1) | 0.11 | 0.09 | 0.13 | 0.18 | 0.10 |
| Mol ratio of sodium (*2) | 0.22 | 0.15 | 0.10 | 0.06 | 0.16 |
| Ca:Na | 1:2.0 | 1:1.67 | 1:0.77 | 1:0.33 | 1:1.6 |

TABLE 33

| | Comparative example 41 | Comparative example 42 | Comparative example 43 | Comparative example 44 | Comparative example 45 |
|---|---|---|---|---|---|
| Mol ratio of calcium (*1) | 0.13 | 0.19 | 0.13 | 0.15 | 0.20 |
| Mol ratio of sodium (*2) | 0.07 | 0.05 | 0.14 | 0.09 | 0.05 |
| Ca:Na | 1:0.53 | 1:0.26 | 1:1.08 | 1:0.60 | 1:0.25 |

The mol ratio of the calcium and the mol ratio of the sodium with respect to the monomeric unit of the alginate contained in the obtained dried product and the ratios are listed in Tables 32 and 33. The results of the amount of water absorption, the melting rate, the maintenance of the shape, and the oral sensation are listed in Table 34.

Separate from this, the saline of Working examples 48 to 50, which are listed in Table 31, were not added while the agar and the sodium alginate were a solution. The salts were added by dipping after the agar and the sodium alginate were dipped in the calcium chloride solution and a gel was formed. Specifically, the gel of 500 g was dipped for one hour in a saline solution (0.6% solution, 1000 mL). Then, the noodle-shaped gel was extracted and dried at 60° C. Thus, the dried product made of the agar and the alginate was produced. The mol ratio of the calcium and the mol ratio of the sodium with respect to the monomeric unit of the alginate contained in the obtained dried product and the ratios are listed in Table 35. The results of the amount of water absorption, the melting rate, the maintenance of the shape, and the oral sensation are listed in Table 36.

TABLE 30

| | |
|---|---|
| Agar (3) | 80 g |
| Sodium alginate (2) | 320 g |
| Water | Total 20000 g |

TABLE 34

| | Amount of water absorption at 20° C. (time) | Amount of water absorption at 90° C. (time) | Melting rate (%) | Maintenance of shape | Oral sensation |
|---|---|---|---|---|---|
| Working example 47 | 54 | 72 | 0.5 | Shape maintained | Gel with appropriate hardness |
| Comparative example 37 | 84 | *5 | — | — | Too soft and strong adherability |
| Comparative example 38 | 68 | *5 | — | — | Too soft and strong adherability |
| Comparative example 39 | 55 | *5 | — | — | Too soft and strong adherability |
| Comparative example 40 | 80 | *5 | — | — | Too soft and strong adherability |
| Comparative example 41 | 65 | *5 | — | — | Too soft and strong adherability |
| Comparative example 42 | 53 | *5 | — | — | Too soft and strong adherability |
| Comparative example 43 | 79 | *5 | — | — | Too soft and strong adherability |

TABLE 34-continued

| | Amount of water absorption at 20° C. (time) | Amount of water absorption at 90° C. (time) | Melting rate (%) | Maintenance of shape | Oral sensation |
|---|---|---|---|---|---|
| Comparative example 44 | 60 | *5 | — | — | Too soft and strong adherability |
| Comparative example 45 | 48 | *5 | — | — | Too soft and strong adherability |

TABLE 35

| | Working example 48 | Working example 49 | Working example 50 |
|---|---|---|---|
| Mol ratio of calcium (*1) | 0.11 | 0.12 | 0.13 |
| Mol ratio of sodium (*2) | 0.22 | 0.26 | 0.27 |
| Ca:Na | 1:2.0 | 1:2.17 | 1:2.08 |

TABLE 36

| | Amount of water absorption at 20° C. (time) | Amount of water absorption at 90° C. (time) | Melting rate (%) | Maintenance of shape | Oral sensation |
|---|---|---|---|---|---|
| Working example 48 | 64 | 92 | 3.5 | Shape maintained | Gel surface was slightly melted to extent of slightly weak but causing no problem. |
| Working example 49 | 64 | 94 | 3.8 | Shape maintained | Gel surface was slightly melted to extent of slightly weak but causing no problem. |
| Working example 50 | 68 | 95 | 3.9 | Shape maintained | Gel surface was slightly melted to extent of slightly weak but causing no problem. |

As described above, instead of the sodium chloride, the salt that has an effect of blocking calcium, such as phosphate and sodium citrate, was used in a state where the sodium alginate was a solution, the dried product absorbed water well in the case where the solution is water, however, the dried product did not have the heat resistance at 90° C. and therefore the gel was dissolved. In contrast to this, the salt that has an effect of blocking calcium, was used in a state where the calcium alginate was a gel, the surface of the gel was observed to be slightly dissolved compared with the case of using the sodium chloride. This became a slightly weak gel but had no problem.

Experimental Example 15

In the Case where Timing of Adding Monovalent Cation were Changed

The dried product made of the agar and the alginate with the combinations listed in Table 37 was produced. Specifically, the agar (4) and the sodium alginate (1) were dispersed and dissolved in water. Then, the materials were warmed to 110° C. with an autoclave and then were dissolved. This water was filled in a container and then was cooled and coagulated. Afterward, the coagulation was cut off into the noodle shape (4 mm square×15 cm). The noodle-shaped pectized materials were dipped in monovalent cation solutions listed in Table 38 for one hour. At this time, the amount of monovalent cation solution was designed to be 1000 g while an amount of the gel was designed to be 500 g. After extracting the gel, the gel was dipped in the calcium chloride solution at a concentration of 0.20% for three hours. At this time, the amount of calcium chloride liquid was designed to be 1000 g. After the dipping, the noodle-shaped gel was extracted and was dried at 60° C. Thus, the dried products formed of the agar and the alginate were produced (Working examples 51 to 54).

The mol ratio of the calcium and the mol ratio of the sodium with respect to the monomeric unit of the alginate contained in the obtained dried product and the ratios are listed in Table 39. The results of the amount of water absorption, the melting rate, the maintenance of the shape, and the oral sensation are listed in Table 40.

TABLE 37

| Agar (4) | 90 g |
|---|---|
| Sodium alginate(1) | 420 g |
| Water | Total 20000 g |

TABLE 38

| Working example 51 | Sodium chloride 0.2% |
|---|---|
| Working example 52 | Sodium chloride 0.4% |
| Working example 53 | Sodium hexametaphosphate 0.2% |
| Working example 54 | Sodium hexametaphosphate 0.4% |

TABLE 39

| | Working example 51 | Working example 52 | Working example 53 | Working example 54 |
|---|---|---|---|---|
| Mol ratio of calcium (*1) | 0.24 | 0.15 | 0.09 | 0.06 |
| Mol ratio of sodium (*2) | 0.28 | 0.54 | 0.15 | 0.30 |
| Ca:Na | 1:1.17 | 1:3.60 | 1:1.67 | 1:5.00 |

TABLE 40

| | Amount of water absorption at 20° C. (time) | Amount of water absorption at 90° C. (time) | Melting rate (%) | Maintenance of shape | Oral sensation |
|---|---|---|---|---|---|
| Working example 51 | 52 | 75 | 0.3 | Shape maintained | Gel with appropriate hardness |

TABLE 40-continued

| | Amount of water absorption at 20° C. (time) | Amount of water absorption at 90° C. (time) | Melting rate (%) | Maintenance of shape | Oral sensation |
|---|---|---|---|---|---|
| Working example 52 | 55 | 78 | 0.5 | Shape maintained | Gel with appropriate hardness |
| Working example 53 | 65 | 89 | 3.1 | Shape maintained | Gel surface was slightly melted to extent of slightly weak but causing no problem. |
| Working example 54 | 70 | 95 | 4.2 | Shape maintained | Gel surface was slightly melted to extent of slightly weak but causing no problem. |

As described above, when the agar was pectized and was reacted to the monovalent cation and then was reacted to the divalent cation exhibited the good result. The working example using the sodium chloride as monovalent cation exhibited less melting rate compared with the case of using the sodium hexametaphosphate and therefore also obtained good result in terms of the oral sensation.

The invention claimed is:

1. A dried composition comprising:
   agar and alginate at a weight ratio of 1:1 to 1:20, wherein
   the alginate contains a salt of a monovalent cation and a salt of a divalent cation,
   the divalent cation is 0.04 to 0.30 mol per mol and further the monovalent cation is 0.10 to 0.70 mol per mol with respect to a monomeric unit of the alginate,
   a mol ratio of the divalent cation to the monovalent cation is 1.0:0.35 to 1.0:8.70,
   the agar, the salt of the monovalent cation, and the salt of the divalent cation are intertwined,
   the dried composition is able to absorb water and swell in distilled water at 20° C. and distilled water at 90° C., and in both the cases the dried composition becomes a gel having a weight of 15 to 100 times of the dried composition, and
   the dried composition is obtained by a production method comprising:
      obtaining a mixed solution where agar and alginate are dissolved
      obtaining an agar gel by cooling the mixed solution;
      obtaining an alginate gel by reacting a divalent cation to the alginate;
      dehydrating and drying the agar gel and the alginate gel; and
      adding a monovalent cation during each of the processes, between the respective processes, or after the process of dehydrating and drying.

2. The dried composition according to claim 1, wherein the salt of monovalent cation is one or more of sodium alginate, potassium alginate, and ammonium alginate, and
the salt of divalent cation is calcium alginate.

3. The dried composition according to claim 1, wherein the dried composition has a shape of one or more of a powder shape, a granular shape, a noodle shape, a plate shape, and a cube shape.

4. The dried composition according to claim 2, wherein the dried composition has a shape of one or more of a powder shape, a granular shape, a noodle shape, a plate shape, and a cube shape.

5. The dried composition according to claim 1, wherein the agar is a high-melting point agar whose melting point is 90° C. or higher.

6. The dried composition according to claim 2, wherein the agar is a high-melting point agar whose melting point is 90° C. or higher.

7. The dried composition according to claim 3, wherein the agar is a high-melting point agar whose melting point is 90° C. or higher.

8. The dried composition according to claim 4, wherein the agar is a high-melting point agar whose melting point is 90° C. or higher.

9. The dried composition according to claim 1, wherein the gel formed by causing the dried composition to absorb water and swell is able to hold a shape in a retort sterilization at 100° C. or higher.

10. The dried composition according to claim 2, wherein the gel formed by causing the dried composition to absorb water and swell is able to hold a shape in a retort sterilization at 100° C. or higher.

11. The dried composition according to claim 3, wherein the gel formed by causing the dried composition to absorb water and swell is able to hold a shape in a retort sterilization at 100° C. or higher.

12. The dried composition according to claim 4, wherein the gel formed by causing the dried composition to absorb water and swell is able to hold a shape in a retort sterilization at 100° C. or higher.

13. The dried composition according to claim 5, wherein the gel formed by causing the dried composition to absorb water and swell is able to hold a shape in a retort sterilization at 100° C. or higher.

14. The dried composition according to claim 6, wherein the gel formed by causing the dried composition to absorb water and swell is able to hold a shape in a retort sterilization at 100° C. or higher.

15. The dried composition according to claim 7, wherein the gel formed by causing the dried composition to absorb water and swell is able to hold a shape in a retort sterilization at 100° C. or higher.

16. The dried composition according to claim 8, wherein the gel formed by causing the dried composition to absorb water and swell is able to hold a shape in a retort sterilization at 100° C. or higher.

17. A food product comprising
the dried composition according to claim 1.

18. The food product according to claim 17, wherein the dried composition is contained: as a daily dish of one or more of a noodle-shaped food product, a soup main ingredient, a hot-pot dish ingredient, a stir-fried food, a deep-fried food, a steamed food, a boiled food, and a marinated food; and as a food material of one or more of a salad, a pickle, a dessert material, a beverage, a frozen dessert, a jam, a fruit sauce, a fish egg imitation, a sarcocarp imitation, a wrap of a spring roll, a wrap of a shaomai, and a dietary fiber-enriched food.

* * * * *